(12) United States Patent
Laurent-Lund

(10) Patent No.: US 7,343,071 B2
(45) Date of Patent: Mar. 11, 2008

(54) OPTICAL COMPONENT AND A METHOD OF FABRICATING AN OPTICAL COMPONENT

(75) Inventor: Christian Laurent-Lund, Copenhagen S (DK)

(73) Assignee: Ignis Technologies AS, Horten (NO)

( * ) Notice: Subject to any disclaimer, the term of this patent is extended or adjusted under 35 U.S.C. 154(b) by 44 days.

(21) Appl. No.: 10/516,527

(22) PCT Filed: Jun. 4, 2003

(86) PCT No.: PCT/DK03/00368

§ 371 (c)(1),
(2), (4) Date: Jun. 6, 2005

(87) PCT Pub. No.: WO03/102648

PCT Pub. Date: Dec. 11, 2003

(65) Prior Publication Data

US 2005/0207705 A1    Sep. 22, 2005

Related U.S. Application Data

(60) Provisional application No. 60/385,891, filed on Jun. 6, 2002.

(30) Foreign Application Priority Data

Jun. 4, 2002    (DK)    ................ 2002 00855

(51) Int. Cl.
*G02B 6/26*    (2006.01)
(52) U.S. Cl. .............. 385/45; 385/50; 385/31
(58) Field of Classification Search ........ None
See application file for complete search history.

(56) References Cited

U.S. PATENT DOCUMENTS 4,781,424 A    11/1988    Kawachi et al.

(Continued)

FOREIGN PATENT DOCUMENTS

EP    0 424 913 A2    5/1991

(Continued)

OTHER PUBLICATIONS

H. Nishihara et al., "Optical Integrated Circuits", McGraw-Hill, 1989.

(Continued)

*Primary Examiner*—Sung Pak
(74) *Attorney, Agent, or Firm*—Jacobson Holman PLLC

(57) ABSTRACT

The invention relates to a method of manufacturing an optical component (800). It also relates to a branching unit and to a method of reducing insertion loss in an optical branching unit. It further relates to a method of reducing stress induced polarization effects in spaced planar waveguides (e.g. couplers) and stress induced tilting of the cores due to strain fields introduced by the top-cladding. It also relates to a method for filling high-aspect-ratio structures with material during reflow. The present invention proposes the use of additional structural elements such as transversal elements (850) connected to or pads (840, 841) or elongate elements located in the vicinity of ordinary waveguide core sections (801, 802). The additional structural elements are typically formed in the same processing step as the ordinary waveguide core sections. The additional structural elements have the purpose of enabling a better filling of small volumes between closely spaced waveguide core sections with cladding material thereby avoiding the creation of voids and to reduce the stress induced in neighbouring waveguide core sections thereby reducing birefringence. In some cases this or these effects may be combined with an improved control of the coupling of light from one waveguide to the other (such as in a directional coupler) or the provision of a gradual change in refractive index over a certain length between neighbouring waveguides (such as in a splitter). The invention may be used in connection with the distribution of signals in optical systems (e.g. CATV) or components, e.g. in the form of splitters and VOAs, as individual components or integrated on a chip.

58 Claims, 16 Drawing Sheets

U.S. PATENT DOCUMENTS

| | | | |
|---|---|---|---|
| 4,978,188 A * | 12/1990 | Kawachi et al. ............ 385/130 |
| 5,058,978 A | 10/1991 | Kondoh et al. |
| 5,629,999 A | 5/1997 | Henry et al. |
| 5,745,618 A | 4/1998 | Li |
| 5,745,619 A | 4/1998 | Li et al. |
| 5,757,995 A | 5/1998 | Chen et al. |
| 5,818,989 A * | 10/1998 | Nakamura ................... 385/45 |
| 6,044,192 A | 3/2000 | Grant et al. |
| 6,195,481 B1 | 2/2001 | Nakajima et al. |
| 6,212,307 B1 | 4/2001 | Labeye et al. |
| 6,621,971 B2 | 9/2003 | Orignac et al. |
| 6,697,552 B2 * | 2/2004 | McGreer et al. ............. 385/37 |
| 7,006,729 B2 * | 2/2006 | Wang et al. .................. 385/37 |
| 2003/0165295 A1 | 9/2003 | Doerr |

FOREIGN PATENT DOCUMENTS

| | | |
|---|---|---|
| EP | 0 731 367 A2 | 9/1996 |
| EP | 0 811 860 A2 | 12/1997 |
| EP | 1 045 263 | 10/2000 |
| JP | 11 271 551 A2 | 10/1999 |
| JP | 2000075 327 A2 | 3/2000 |
| WO | WO 97/32228 | 9/1997 |
| WO | WO 00/48024 | 8/2000 |
| WO | WO 01/90791 | 11/2001 |
| WO | WO 02/088791 A2 | 11/2002 |

OTHER PUBLICATIONS

J.D. Love et al., "Highly broadband Buried Channel Couplers", Electronic Letters, vol. 30, No. 22, pp. 1853-1855, Oct. 1994.

A. Takagi et al., Broadband Silica-Based Optical Waveguide Coupler with Asymmetric Structure, Electronic Letters, vol. 26, No. 2, pp. 132-133, Jan. 1990.

M. Kawachi., Silica Waveguides on Silicon and Their Application to Integrated-Optic Components, Optical and Quantum Electronics 22, pp. 391-416, 1990.

C. Laurent-Lund et at., "PECVD Grown Multiple Core Planar Waveguides . . . ", IEEE Photonics Technology Letters, vol. 10, No. 10, Oct. 1998, pp. 1431-1433.

R.A. Levy et al., "Reflow Mechanisms of Contact Vias in VLSI Processing", J. Electrochemical Society, vol. 133, No. 7, pp. 1417-1424.

* cited by examiner

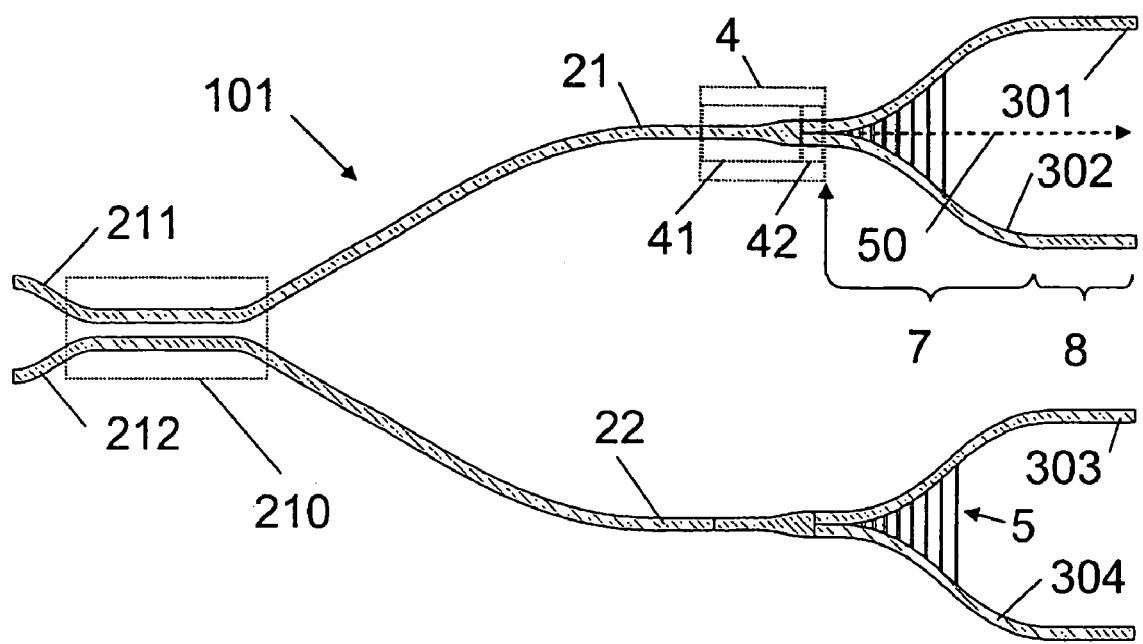
Fig. 5.a
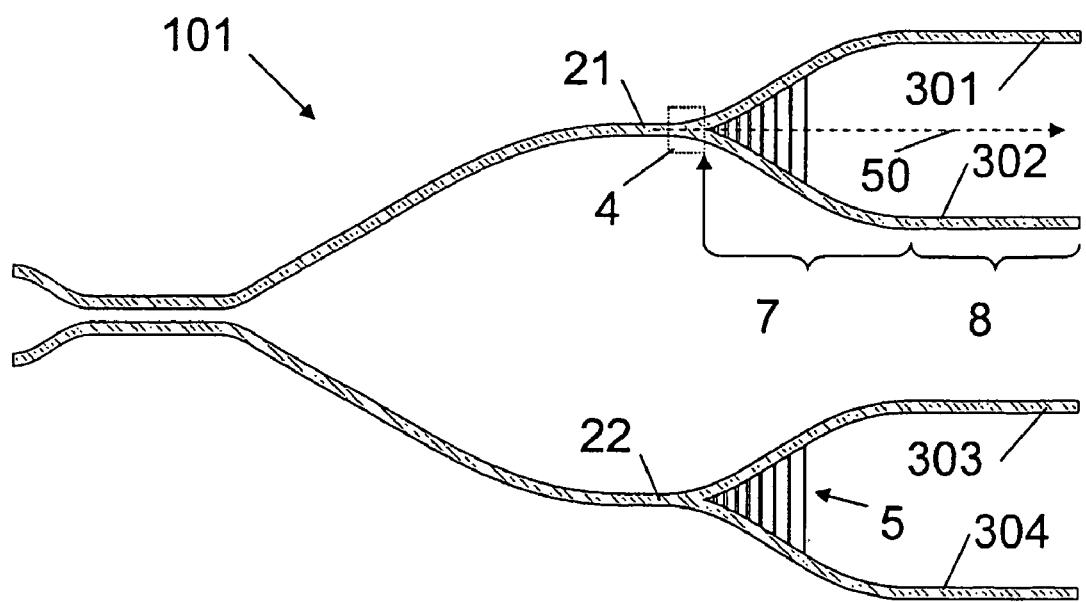
Fig. 5.b

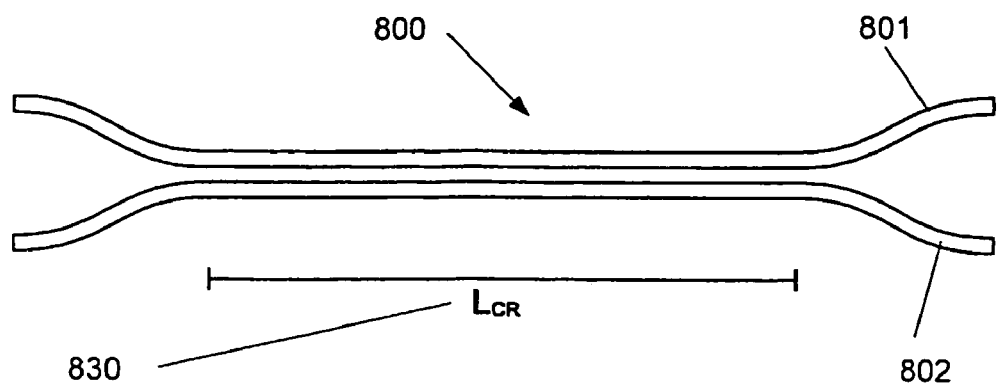
Fig. 21
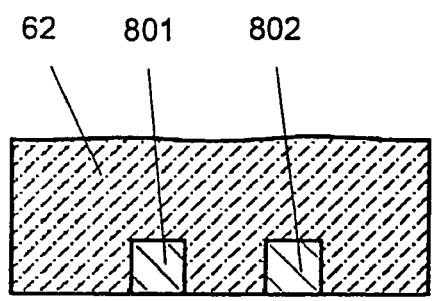
Fig. 22.a
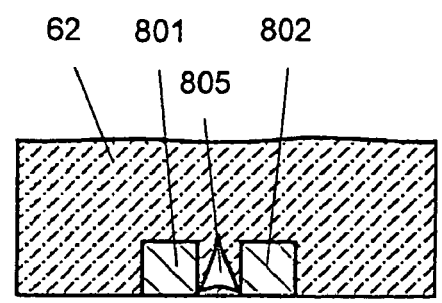
Fig. 22.b
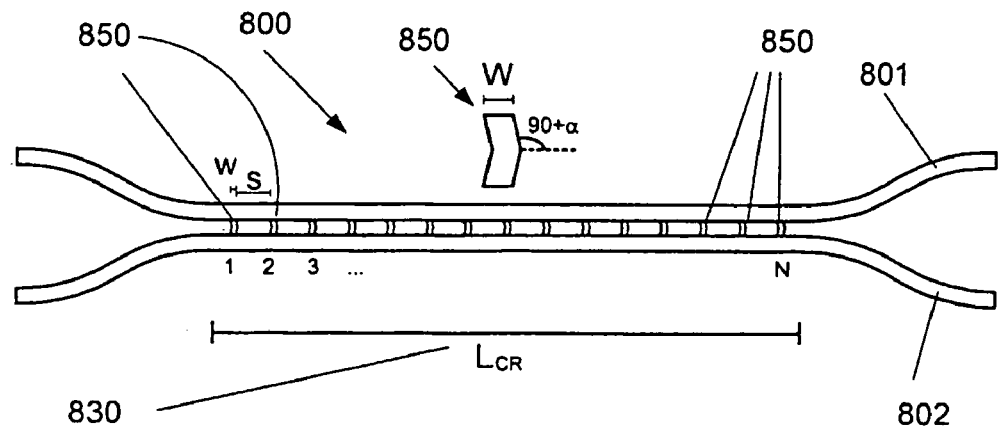
Fig. 23

OPTICAL COMPONENT AND A METHOD OF FABRICATING AN OPTICAL COMPONENT

This is a nationalization of PCT/DK03/00367 filed 4 Jun. 2003 and published in English, claiming benefit of U.S. provisional application No. 60/385,891, filed Jun. 6, 2002 and Denmark application number PA 200200855, filed Jun. 4, 2002.

TECHNICAL FIELD

The present invention relates to the field of planar optical components for use in optical communications systems.

The invention relates specifically to a method of manufacturing an optical component.

It also relates to a branching unit and to a method of reducing insertion loss in an optical branching unit.

It further relates to a method of reducing stress induced polarization effects in spaced planar waveguides (e.g. couplers) and stress induced tilting of the cores due to strain fields introduced by the top-cladding.

It also relates to a method for filling high-aspect-ratio structures with material during reflow.

The invention may e.g. be useful in applications such as optical communications systems, specifically in connection with the distribution of signals in optical systems (e.g. CATV) or components, e.g. in the form of low loss, high uniformity splitters, couplers and variable optical attenuators (VOAs), either as individual components or integrated with other functions on a chip.

BACKGROUND ART

The following account of the prior art relates to one of the areas of application of the present invention, optical communications systems.

Loss Reduction:

A planar optical branching component, such as a power Y-splitter, often plays a fundamental role in simple as well as complicated designs. The function that a Y-splitter performs is to divide the incoming signal into typically two signals of equal magnitude (50%:50%). It should be noted, that even though we in this text focus on the so-called Y-splitters, the presented idea can be used in branching components that divide the incoming signal(s) into more than just two output waveguides as well as into varying splitting ratios, not just 50%:50%.

Often it is of interest to be able to divide one or more signals into a large number of signals. To achieve this goal typically a so-called splitter tree is used where a number of fundamental splitters are concatenated. A 1-4 splitter (tree) is then realized by concatenating two 1-2 splitters to the two outputs of a first 1-2 splitter. Furthermore, a 1-8 splitter is realized by concatenating four 1-2 splitters to the 1-4 splitter (one 1-2 splitter to each of the four outputs). In this way it is possible to realize $1\text{-}2^N$ splitter-trees using only the simple 1-2 splitter. $2\text{-}2^N$ can be realized using a similar approach where a 2-2 branching component (e.g. a coupler) is followed by two separate $1\text{-}2^{N-1}$ splitter trees.

Typically it is desirable that the splitter distributes the incoming signal equally between the output waveguides and with minimum optical loss. To achieve the goal of equal splitting, the individual splitters need to divide the incoming signals equally, i.e. x %:x % where x is as close as possible to 50.

If a splitter divides the signal equally and without loss, i.e. x=50, the intensity of the signal in the two output waveguides will be $P_{output}=-10*\log(\frac{1}{2})=3.01$ dB lower than the original signal. For a loss-less 1-4 splitter the power in the four output waveguides will be $P_{output}=2*3.01=6.02$ dB lower than the original signal, and for a 1-16 splitter the output power will be $P_{output}=4*3.01=12.04$ dB than the original signal. Thus for a 1-16 splitter the theoretical minimum reduction in the power level in an equally splitting component will be 12.04 dB.

There is no such thing as a loss-less passive optical components since there will always be coupling losses, propagation losses, radiation losses etc.

These loss factors can be minimized by proper choice of waveguide cross-sectional geometry, refractive index of the core material and cladding materials, as well as by choosing suitable curve-forms for the component layout. By suitable choices we managed to fabricate low-loss 1-16 components having typical values of insertion loss in the neighbourhood of 13.5 dB which is 13.5–12.04=1.46 dB above the theoretical minimum. Assuming that the extra loss is equally distributed among the four splittings in the 1-16 splitter tree the loss per fundamental splitter is 1.46 dB/4=0.365 dB (neglecting the coupling loss from the fibre to the chip). In order to come near the theoretical minimum we thus need to reduce the excess loss per splitter by a few tenths of a dB.

U.S. Pat. No. 5,745,618 discloses a 1-P power splitter comprising an input waveguide and P output waveguides that are all coupled to a slab waveguide in the form of a planar area, which is large compared to the area of an individual waveguide and designed to support light wave transmission between the input and output waveguides. The power splitter further comprises a transition region immediately adjacent to the slab waveguide which comprises a number of silica paths (e.g. 30) that transversely intersect the output waveguides. The silica paths are generally parallel to each other and have widths that progressively decrease as they become further away from the slab waveguide.

The present application discloses an optical branching component and a method of reducing the loss of optical power in branching components, in particular $1\text{-}2^N$ splitters, which makes possible the fabrication of e.g. 1-16 (N=4) splitters having an insertion loss of approximately 12.3-12.5 dB (typically).

Stress Relieving:

The present invention further deals with the issue of reducing stress induced polarization effects and stress induced tilting of the cores in planar optical components, e.g. waveguide couplers. Since the top-cladding introduces a non-symmetric strain field across closely spaced waveguides, measures have to be taken to minimize these effects.

One way to reduce this non-symmetric behaviour is to place the waveguide cores of the coupler as far apart as possible to approach an isolated waveguide situation. This way each waveguide core in the coupler will see a quasi-symmetrical surrounding and the strain field will be more uniform across the waveguide core. By placing the waveguide cores far apart in the coupler region, the length of the coupler device will be significantly larger. Therefore this solution is not very suitable for compact device design.

Other means of reducing this effect is by using a polymer over-cladding that is heat-treated at low temperatures (<~300° C.). Because of the relatively low process temperature, the thermally induced stress effects will be smaller and consequently the stress levels lower. Polymer top-cladding has an inherent reliability problem and is therefore generally not used in commercial products.

Gap-filling:

The present invention further deals with the issue of gap-filling, which for planar waveguide fabrication is a technological challenge. Since most of the deposition processes are of a planar type, special measures have to be taken to fill high-aspect-ratio trenches (e.g. trenches that have a height to width ratio larger than 2 where the height dimension is taken in a direction of growth of the planar process and the width dimension is taken perpendicular thereto). This can be done by adding e.g. boron and phosphorus to the glass whereby the flowing temperature can be reduced to typical anneal temperatures used in planar waveguide fabrication. The reflow-properties of the glass is, however, very dependent on the structures that have to be covered, e.g. a directional coupler. A directional coupler may be used either as an individual component in itself, or as a part in a larger functionality. A directional coupler consists of two separate waveguides which, over a distance known as the coupling length ($L_{CR}$), are closely spaced (cf. FIG. 21).

If the two cores pertaining to the two separate waveguides are sufficiently close, the exponentially decaying tail of the optical field in the first waveguide core may be able to reach into the core of the second waveguide core. Being in the second waveguide core, the field pertaining to the first waveguide core is creating a polarization of the atoms in the core medium which in turn generates a new optical field in the second core. The greater the magnitude of the field pertaining to waveguide 1 in waveguide 2, the greater is the polarization and hence the faster the transfer of energy, which translates to a shorter length for full coupling. In this way the energy in the field in the first waveguide core can be gradually transferred to the second waveguide core. As the field decays exponentially outside the core regions of either of the waveguides, it is necessary that the two waveguide cores are closely spaced if good coupling and hence a short coupling length is to be achieved. If the distance between the two waveguide cores increases, the distance along the length in which a certain percentage of the energy from the field in the first waveguide is coupled to the field in the second waveguide increases exponentially. The smaller the components, the more components per unit area or wafer may be implemented, which—for directional couplers—requires that the waveguide cores in the coupling region be closely spaced.

In a directional coupler where the two cores are closely spaced, the distance edge-to-edge between the two cores is small (e.g. less than 5 µm apart or even less than 1 µm apart), especially relative to the waveguide height—i.e. there will be a large aspect-ratio (waveguide height divided by the edge-to-edge distance).

In a deposit-etch-deposit planar technology, a layer of core material is firstly deposited on a lower cladding layer, secondly the core layer is patterned using standard photo-lithographic techniques and the pattern is transferred to the core layer by etching. The pattern created during the etch step is finally covered and protected by deposition of a layer of material typically having optical characteristics as the lower cladding layer.

If one uses a deposition method that does not deposit conformably onto the underlying structures, i.e. does not deposit as fast (typically slower) on vertical faces (in a direction of growth or deposition) as on horizontal faces (i.e. parallel to a planar face of the substrate and perpendicular to a direction of growth of planar layers), problems are likely to arise in areas having large aspect-ratios. During deposition the area above the narrow opening will gradually close while leaving the volume between the two waveguides partly empty (i.e. comprising voids, so-called 'keyholes' or 'air-pockets'). The deposition rate at the horizontal face at the bottom of the narrow opening is considerably lower than on horizontal faces outside the coupling region, as the material flow into the volume between the two waveguides is restricted by a shadowing effect from the waveguides themselves. Furthermore, the deposition of material grows laterally (i.e. extending from side to side) from the upper corners of the waveguides towards the central part of the coupling region which further increases the shadowing effect. The result is that a void or air pocket is created in the region between the two waveguides (cf. FIG. 22.b).

The magnitude of the exponentially decaying evanescent field tail is more or less exponentially dependent upon the refractive index difference of the core material and the surrounding material. Typically the refractive index of the material that surrounds the core will have a value only slightly smaller than that of the core, in order to create a structure that is matched to a standard optical fibre, e.g. a SMF-28 fibre. For such a fibre the core refractive index typically is around 1.450 @ 1.55 µm, whereas the cladding refractive index has a refractive index around 1.445 @ 1.55 µm, i.e. a refractive index difference of around $5 \cdot 10^{-3}$. If a void is present between the two closely spaced waveguide cores of the directional coupler this void will constitute an area having a refractive index 1 (that of a vacuum), hence the refractive index difference will now be around 0.450. This will obviously make the optical coupling between the two waveguides uncontrollable and non-reproducible and thus render the component useless.

To ease the filling of the narrow space between the two waveguides in the coupling region, a multi-step process is typically applied. In such a process a layer of cladding material is deposited followed by a high-temperature treatment where the entire structure is heated to above the glass-transition temperature of the cladding material, which makes the cladding material soft. When the cladding material is soft it can flow and redistribute itself (reflow) thereby better fill the narrow spaces. This process is repeated a number of times making it possible to cover most encountered structures. However, sometimes structures/designs having aspect-ratios that prevent perfect filling of the narrow spaces are seen.

One solution to the problem of gap filling is to increase the doping level of boron and phosphorus. This will "soften" the cladding material even further and thereby promoting the gap filling. However, the higher doping concentration makes the glass less reliable and more susceptible to water. It is therefore necessary to use hermetical packaging which increases the cost of the components.

Another solution to the problem is to use other deposition processes such as flame-hydrolysis deposition (FHD) or Low Pressure Chemical Vapour Deposition (LPCVD). Both these processes have better step-coverage properties than plasma enhanced chemical vapour deposition (PECVD), but other factors such as lack of scalability, flexibility, control and automatic fabrication, etc. speak against these methods.

DISCLOSURE OF INVENTION

The present invention proposes the use of additional structural elements such as transversal elements connected to or pads or elongate elements located in the vicinity of ordinary waveguide core sections. The additional structural elements are typically formed in the same processing step as the ordinary waveguide core sections. The additional structural elements have the purpose of enabling (an experimentally observed fact of) a better filling of small volumes between closely spaced waveguide core sections with cladding material thereby avoiding the creation of voids and to reduce the stress induced in neighbouring waveguide core sections thereby reducing birefringence. In some cases this or these effects may be combined with an improved control of the coupling of light from one waveguide to the other (such as in a directional coupler) or the provision of a gradual change in refractive index over a certain length between neighbouring waveguides (such as in a splitter), thereby reducing insertion loss.

A Method of Manufacturing an Optical Component Comprising Transversal Elements:

Objects of the invention are achieved by a method of manufacturing an optical component comprising a combination of planar waveguides on a substrate, the combination of waveguides comprising spaced, parallel, diverging or merging waveguide core sections forming a core region layout in a planar view, the method comprising the steps of
a) providing a substrate,
b) forming a lower cladding layer on the substrate,
c) forming a core layer on the lower cladding layer,
d) providing a core mask comprising a core pattern corresponding to the core region layout and a layout of transversal elements, the transversal elements extending between at least two of said spaced, parallel, diverging or merging waveguide core sections, thereby fully or partially connecting them,
e) forming core sections and transversal elements using said core mask, a photolithographic and an etching process, and
f) forming an upper cladding layer to cover the waveguide core sections, the transversal elements and the lower cladding layer wherein at least one of the steps b), c), f) is performed by plasma enhanced chemical vapour deposition.

Advantages of the invention are that a combined effect of preventing or minimizing the generation of voids in the cladding layer around closely spaced waveguide core sections and the precise control of the refractive index in the region between spaced waveguides, potentially leading to lower losses of the component. The use of plasma enhanced chemical vapour deposition (PECVD) in the manufacturing process has the advantages of a commercially available, proven technology from many years of service in the semiconductor industry. PECVD is a flexible method providing good control of essential parameters such as thermal expansion, refractive index and thickness of corresponding layers of the component.

The term 'spaced' is in the present context taken to mean that the coupling of optical power between a waveguide and its 'spaced' neighbour is larger than $\frac{1}{1000}$ of the total optical power propagated by the waveguide in question. In an embodiment of the invention, the shortest distance between faces perpendicular to the substrate of substantially parallel waveguides is less than twice the height of the waveguide in question, such as less than the height, such as less than half the height of the waveguide in question. In an embodiment of the invention, the shortest distance between faces perpendicular to the substrate of parallel waveguides is less than 10 µm, such as less than 5 µm, such as less than 1 µm.

The term 'diverging' is in the present context taken to mean extending in different directions from a common point, i.e. as embodied e.g. in the input and output waveguides of a coupler comprising two waveguides that are parallel over a certain length and diverge from each other (over a certain length) at both ends (cf. e.g. FIG. 21).

The term 'merging waveguide core sections' is in the present context taken to mean that two waveguide core sections meet and join to one in a fork or Y-type structure such as in a splitter (cf. e.g. FIG. 1). The term split may just as well be used.

In an embodiment of the invention, the substrate is a silicon substrate, and the core and cladding layers comprise silica glass. The term 'silica glass' is in the present context taken to mean a $SiO_2$ based glass optionally comprising dopant elements such as boron, phosphorus, aluminium, fluorine, germanium, nitrogen, erbium (or other rare earth elements), titanium, etc. e.g. aimed at modifying the optical properties (e.g. refractive index) and/or the thermal expansion properties of the resulting material.

In an embodiment of the invention, the amount of dopant elements in the glass matrix is larger than 0.1 weight %, e.g. larger than 5 weight %, such as larger than 10 weight %.

In an embodiment of the invention, the upper cladding layer has a lower flow temperature than that of the core and the lower cladding layer. In an embodiment of the invention, the flow temperature of the upper cladding layer is adapted so that the waveguide core sections do not flow during an annealing that flows the upper cladding layer (at the anneal temperature and time in question). In an embodiment of the invention, the flow temperature (in ° C.) of the upper cladding layer is at least 10% lower than that of the core and the lower cladding layer such as at least 20% lower such as at least 50% lower. In an embodiment of the invention, the flow temperature of the upper cladding layer is at least 20° C. lower than that of the core and the lower cladding layer such as at least 50° C. lower such as at least 100° C. lower.

In general, all elements that lower the flow temperature may be used as dopant elements in appropriate amounts.

In an embodiment of the invention, the upper cladding layer comprises boron and/or phosphorus. In an embodiment of the invention the amounts of boron and phosphorus are in total larger than 3 weight % such as each larger than 1 weight %.

In an embodiment of the invention, the optical characteristics of the upper and lower cladding layers are similar. In an embodiment of the invention, the refractive index difference between the lower and upper cladding layers are less than 0.1% such as less than 0.05%, such as less than 0.01%.

In an embodiment of the invention, the formation of all layers on the substrate are made by plasma enhanced chemical vapour deposition. Other techniques for applying layers to a substrate having problems with gap filling may of course be used.

In an embodiment of the invention, step f) comprises successive deposition and annealing steps. The annealing process should be carried out at corresponding values of temperature and time allowing a stabilization of the glass structures. In an embodiment of the invention, the anneal temperature is between 800 and 1200° C., such as 1000° C.

In an embodiment of the invention, the waveguide core sections that are fully or partially connected by transversal elements form part of a coupler or a splitter.

In an embodiment of the invention, the waveguide core sections that are fully or partially connected by transversal elements run essentially parallel over a certain length of the waveguides (e.g. 500-1000 µm) of the waveguides.

In an embodiment of the invention, the waveguide core sections that are fully or partially connected by transversal elements essentially diverge from each other over a certain length (e.g. 500-1000 µm) of the waveguides.

In an embodiment of the invention, at least one of the transversal elements fully connects two waveguide core sections.

Loss Reduction in a Splitter:

A problem of the prior art is that no matter how gently one parts the two output waveguide arms in the Y-splitter there will always be a radiation-loss contribution. Furthermore, using a deposit-etch-deposit technology to fabricate the splitter (such as e.g. the silica-on-silicon technology) there will be etch—as well as filling—problems where the two output waveguides are very closely spaced which can give rise to increased propagation loss as well as unequal splitting ratios, hence it is of interest to part the two output waveguides as fast as possible considering losses.

One way to circumvent the problem in the splitting region (the narrow area between the two output waveguides) is to have a graded refractive index profile, such that the refractive index of the region between the waveguides where the two waveguides part is close to the core refractive index and gradually decreases towards the cladding refractive index. One way to achieve this is to use grey-tone photolithography. This, however, requires complicated and expensive masks.

The introduction of a slab waveguide between the input and output waveguides represents another way of dealing with the problem in the splitting region. This, however, has the disadvantage of giving a relatively uneven distribution of power between the individual output waveguides in a given cross section perpendicular to their transmission direction, the outer waveguides containing less power than the centrally positioned output waveguides. Further, the introduction of a slab region increases the risk of exciting higher order modes, with a resulting greater loss.

In the present application, we describe an optical branching component with reduced insertion loss and a method of its manufacture which is implemented directly in the design of the component and does not require the number and character of fabrication processing steps to be modified in any way.

It is an object of the present invention to provide an optical branching unit with reduced insertion loss. It is another object of the invention to provide an optical branching unit with improved uniformity in the power distribution between the individual branches of the unit.

It is a further object of the invention to provide an alternative method of reducing insertion loss and improving uniformity in power distribution in a branching element, which method is relatively simple and may be easily integrated in the normal processing of the branching element in question, and which allows a customized distribution of optical power between its individual output waveguides. It is another object of the invention to provide a method which allows the manufacture of an optical branching unit that is easily scalable.

The objects of the invention are achieved by the invention described in the accompanying claims and as described in the following.

An optical branching unit according to the invention is formed on a substrate, the optical branching unit comprising waveguides for guiding light at a predetermined wavelength $\lambda$, the waveguides comprising a core region, the core region being embedded in a cladding, the waveguides comprising an input waveguide with a core region of width $w_{in}$ and at least two output waveguides having core region widths $w_{out,i}$, a branching part for connecting the input and output waveguide cores, a splitting region adjacent to the branching part, the width of the branching part being equal to $w_{in}$ at its joint with the input waveguide core, the width of the branching part gradually expanding to allow the output waveguide cores to be branched off and diverge from each other in the splitting region, wherein a multitude of M transversal waveguide core elements each having a width $w_i$ and being embedded in said cladding are located in the splitting region forming paths with a mutual centre to centre distance of $s_i$, said transversal waveguide core elements fully or partially connecting neighbouring output waveguide cores. In an embodiment of the invention, the width of the branching part is substantially equal to $w_{in}$ at its joint with the input waveguide core and to the sum of the widths $w_{out,i}$ at its joint with the output waveguide cores, the width of the branching part gradually expanding from its joint with the input waveguide core.

In an embodiment of the invention, the optical branching unit further comprises a parallel region adjacent to the splitting region, and the output waveguide cores run substantially parallel in the parallel region.

In an embodiment of the invention, the core region has a refractive index $n_{core}$ which may vary along the length and/or width of the waveguide. In an embodiment of the invention, the cladding has a refractive index $n_{clad}$ which is typically lower than the refractive index $n_{core}$ of the core region. In an embodiment of the invention, the transversal elements have refractive indices $n_{trans,i}$ which may vary along the length and/or width of the elements. In an embodiment of the invention, $n_{clad}$, $n_{core}$ and $n_{trans,i}$ are substantially constant over the area covered by the optical branching unit and fulfil the relation $n_{clad} < n_{trans,i} < n_{core}$.

In an embodiment of the invention, the branching part has a refractive index $n_{branch}$ equal to that of the core region, $n_{core}$.

It is an advantage of an optical branching unit according to the present invention that it may be manufactured by PECVD, providing a potentially low cost, high-volume, reproducible and reliable component.

In an embodiment of the invention, the cladding comprises lower and upper cladding layers, the core region of a waveguide being formed in a layer applied to the lower cladding layer supported by the substrate and the upper cladding layer being applied to cover the core region and the lower cladding layer.

In an embodiment of the invention, the upper cladding layer comprises boron and/or phosphorus doped silica glass deposited by plasma enhanced chemical vapour deposition as a succession of individually annealed layers.

The widths of the waveguide cores $w_{in}$, $w_{out}$ are to be taken in a transversal cross section (i.e. a cross section perpendicular to the intended direction of light guidance of said waveguide cores at the location of width measurement) as the dimension of the core region of the waveguide in question in a direction parallel to a reference plane defined by the opposing, substantially planar, surfaces of the substrate.

The widths of the transversal waveguide core elements $w_i$ are to be taken as the dimension of the core in a direction parallel to the reference plane and to the direction given by the intended direction of light guidance of the input waveguide core at the joint with the branching part.

The width of the branching part is to be taken as the dimension of the part in a direction parallel to said reference plane and in a cross section perpendicular to the intended direction of light guidance of said branching part at its joint with the input waveguide.

In an embodiment, the widths of the waveguide cores, the transversal waveguide core elements and the branching element in a given transversal cross section are substantially constant in a direction perpendicular to the reference plane (i.e. in a direction of substrate growth), in other words, they have a rectangular (possibly quadratic) cross section. In an embodiment, the height of the waveguide cores, the transversal waveguide core elements and the branching element in a given transversal cross section are substantially equal and given by the thickness of the core layer.

In the present context, the terms 'substantially constant' or 'substantially planar' or 'substantially equal' are taken to mean, respectively, constant and planar and equal within processing tolerances.

In the present context, the term 'said transversal waveguide core elements fully or partially connecting neighbouring output waveguide cores' is taken to mean that the transversal waveguide core elements form, respectively, an uninterrupted and an interrupted path between said neighbouring output waveguide cores.

In the present context, the term 'running substantially parallel in the parallel region' is taken to mean that the output waveguides at least diverge less than in the splitting region, and preferably run parallel as obtainable within the processing tolerances in question.

The centre to centre distance $s_i$ is taken to mean the perpendicular distance between transversal waveguide core element i and element i+1, element 1 being closest to the branching part and element M farthest away. $s_i$ may or may not be a constant over the path of element i.

In an embodiment, the opposing edges of neighbouring diverging (or converging when seen from the parallel region towards the branching part) output waveguide cores meet at a point—when seen in a plane parallel to said reference plane—at the joint with the branching part, the opposing output core edges in question running substantially perpendicular (within processing tolerances) to said reference plane. In other words, the neighbouring output waveguide cores form a fork or Y-type structure, in the latter case, the branching part resembling the points or a switch of a railway.

When opposing edges of neighbouring diverging output waveguide cores meet at the joint with the branching part in a fork or Y-type structure, it is ensured that a particularly simple solution yielding a homogeneous distribution of power between the output waveguides is provided.

When said branching part comprises a tapered part joining the input and output waveguide cores, the width of the tapered part being substantially equal to $w_{in}$ at its joint with the input waveguide core and to the sum of the widths $w_{out,i}$ at its joint with the output waveguide cores, and an abutting region, the output waveguide core regions being aligned with and extending from said tapered region and abutting each other in the abutting region, it is ensured that an alternative and from a design point of view particularly simple solution yielding a homogeneous distribution of power between the output waveguides is provided and reducing the transition/radiation loss (i.e. non-guided light) in the transition between the straight input waveguide and the curved part of the output waveguide. In an embodiment, the tapering of the tapered part is gradual and continuous (within processing tolerances), yielding an adiabatic taper. In an embodiment, the width $w_{out,i}$ of the output vary over its length, i.e. output waveguide i has an initial width $w_{out,ini,i}$ at the joint with the branching part and a final width $w_{out,fin,i}$ in the opposite (output) end. In an embodiment, $w_{out,ini,i} < w_{out,fin,i}$ and further preferred $W_{out,ini,i}$ is half the input waveguide core width ($w_{out,ini,i}=0,5*w_{in}$). This has the advantage that the risk of exciting higher order modes, with a resulting greater loss, in the branching part and its transition to the output waveguides is diminished.

In an embodiment, the refractive indices of the waveguide core and cladding are substantially constant (step index profile), i.e. constant within processing variations, and preferably $n_{core}=1,4520$ and $n_{clad}=1,4450$ at $\lambda=1550$ nm. Alternatively, both indices may have a spatial dependence. The refractive index of the waveguide core may e.g. have a radial dependence (graded index profile) in a cross section perpendicular to the direction of guidance of light of the wavelength $\lambda$.

In an embodiment, the widths $w_{out,i}$ of the individual output waveguide cores are substantially equal providing an equal distribution of the power between the output waveguides (assuming that the design of the transversal waveguide core elements does not cause a redistribution of power). Alternatively, the widths may be different and customized to specific output power ratios between the individual output waveguides.

In an embodiment, the M transversal waveguide core elements for neighbouring output waveguides are placed in the splitting region over a length L extending from the joint between the output waveguides in question and the branching part. Preferably L should be large enough to minimize the insertion loss but not larger than necessary since the remaining transversal waveguide elements will scatter light from the cores and do not contribute to confining the light to the core.

The transversal waveguide core elements are preferably placed in the splitting region over a length L taken in the output direction of the optical branching unit, L being the sum of the individual centre to centre distances $s_i$, i=1, 2, . . . , M of the transversal waveguide core elements.

Alternatively, the transversal waveguide core elements may extend into the parallel region of the branching element.

In the present context, 'the output direction of the optical branching unit' is defined by the intended direction of light guidance of the input waveguide core at the joint with the branching part or—if different therefrom—a tangent to the abutting edge of the one (if the number of output waveguides P is uneven) or two (if P is even) centrally located output waveguide cores in the abutting region).

In an embodiment, the number of transversal waveguide core elements are in the range between 1 and 40. In general, the larger the number of transversal waveguide elements, the more continuous a variation of the effective refractive index of the splitting region and the lower loss is achieved. The actual number is determined as a compromise between design complexity (including a view to practical processing possibilities) and the achieved incremental decrease in loss.

In an embodiment, the width $w_i$ of the transversal waveguide core elements for a given element no. i is substantially constant over its path length.

In an embodiment, the individual centre to centre distances $s_i$, i=1, 2, . . . , M of the transversal waveguide core elements are substantially constant (but not necessarily equal for different i) over the path of the i'th element for all i=1 to M−1. In other words, the transverse elements form parallel or concentric or equivalent paths. Possible deviations there from may e.g. be used to tune the power distribution between the output waveguides, based on a simulation of the layout design in question.

In an embodiment, the width $w_i$ of the transversal waveguide core elements decreases with increasing i as the output waveguide cores diverge. In an embodiment, the width $w_i$ of the transversal waveguide core elements decreases linearly with distance as seen from the abutting region. In other words $w_i$ decreases with increasing i.

In an embodiment, the centre to centre distance $s_i$ between the i'th and the (i+1)'th transversal waveguide core element increases with increasing i as the output waveguide cores diverge.

In both cases, this has the effect of gradually adjusting the effective refractive index of the region between two output waveguide cores to that of the cladding. Preferably, the width $w_i$ as well as the centre to centre distance $s_i$ are, respectively, gradually (i.e. in steps) decreased and increased.

The above mentioned effective refractive index is defined in the following: Instead of considering the true waveguide structure with core and cladding the light propagation can for most situations easily be described with great accuracy as a plane wave propagating in a homogeneous medium having a refractive index $n_{\mathit{eff}}$, the so-called effective refractive index. This effective index stems from eigenvalue equations originating from Maxwell's equations. The effective index of a bound mode is greater than the cladding refractive index, and lower than the core refractive index. The effective index is furthermore a function of the waveguide core cross-sectional geometry. See e.g. H. Nishihara et. al. "Optical Integrated Circuits", McGraw-Hill (1989).

In an embodiment, the refractive indices $n_{trans,i}$ of the transversal waveguide core elements are all equal. In a further preferred embodiment, $n_{trans,i}$ equals the refractive index of the output waveguide cores $n_{core}$. In further preferred embodiments, the refractive indices $n_{trans,i}$ of the transversal waveguide core elements are individually customized using dedicated doping or UV exposure presuming that the transversal waveguide core elements in question are made of a material sensitive to UV-light (such as a Ge-doped silica glass). The refractive index $n_{trans,i}$ may preferably be decreased from transversal element to element with increasing i, e.g. from an initial value for i=1 equal to $n_{core}$ to an end value for i=M of $n_{clad}$. This may be made as an alternative or a supplement to a decreasing width and/or an increasing centre to centre distance of the transversal waveguide core elements.

In an embodiment, the individual tuning of the refractive indices $n_{trans,i}$ of the transversal waveguide core elements is used to tune the distribution of power between the different output waveguides.

In an embodiment, the paths of the output waveguides are symmetrical about a line defined by the centre of the input waveguide at its joint with the branching part.

When the transversal waveguide core elements run substantially parallel and perpendicular to the output direction of the optical branching unit, it is ensured that a particularly low return loss is obtained.

In an embodiment, at least one and preferably all of the transversal waveguide core elements form an uninterrupted path between two neighbouring output waveguide cores. In an embodiment, all of the M transversal waveguide core elements connect two neighbouring output waveguide cores (i.e. form an uninterrupted, continuous path). In an embodiment, at least one of the transversal waveguide core elements is tapered, i.e. has a gradual change of width over a length of its path. This may be used to tune the distribution of power between neighbouring output waveguides, the actual form and dimension being determined by a simulation depending on the actual process and geometrical parameters.

In an embodiment, at least one and preferably all of the transversal waveguide core elements partially connect two neighbouring output waveguide cores (i.e. form an interrupted, optionally tapered, path between them).

In an embodiment, the optical branching unit has 1 input and 2 outputs yielding the function of a Y-splitter. In other preferred embodiments, the optical branching unit has 1 input and 3, 4, 8 or 16 outputs. The branching units with more than 2 outputs are implemented by abutting the number of output waveguides in question in the abutting region and diverging them from each other in the splitting region. In this manner any 1-P power splitter may be manufactured.

Alternatively, a 1-$2^N$ power splitter may be implemented as a splitter tree, by using each of the output waveguides of a 1-2 power splitter as an input to a branching element as described above, yielding a 1-4 power splitter. This may be continued to provide a 1-$2^N$ power splitter.

The two types of splitters may be combined, e.g. by using each of the P outputs of a 1-P power splitter as inputs to a 1-2 splitter, again using each of the 2P outputs of the P 1-2 splitters as inputs to 2P 1-2 splitters, etc. Thereby a 1-P*$2^N$ splitter may be implemented (P=1,2,3, . . . and N=0,1, 2, . . . ), e.g. a 1-12 splitter by combining a 1-3 splitter with 9 1-2 splitters in 2 levels (3 and 6).

In an embodiment, the 1-Q splitter is connected at its input with an X to Y multiplexing component yielding the function of an X to Y*Q distribution component, which may e.g. be used to distribute several different input wavelengths to a number of different outputs, e.g. to achieve improved redundancy in a WDM-system or multiplex different wavelengths into the same splitter, e.g. multiplexing wavelengths from the L band and the C band. In an embodiment, X equals 2. In an embodiment, Y equals 2. In an embodiment, Q equals 2.

The distribution of optical power between the individual output waveguides for an actual layout design may be controlled by (in an iterative process) simulating the power distribution to find an intended ratio between the individual output waveguides, while varying parameters such as refractive indices, width of output waveguide cores, number, location, width and form (e.g. tapering) of the transversal waveguide core elements, etc.

A method of reducing insertion loss in an optical branching unit according to the invention is furthermore provided by the present invention. It comprises the steps of
  providing a substrate and materials system
  deciding a branching configuration and coupling geometry
  deciding a core geometry with a view to said coupling geometry
  deciding a refractive index difference between core and cladding regions
  designing a branching unit layout
  simulate the mode field distribution in an iterative process yielding appropriate combinations of core dimensions and refractive indices, thereby adapting the layout
  determining the minimum bending radius of curvature of the branching unit output arms using a numerical method, preferably a Beam Propagation Method
  determining the number M, width $w_i$, location and mutual distance $s_i$ of the transversal waveguide core elements by iteration by
    selecting a number M of elements
    selecting a length L over which the M elements are to be distributed select a width $w_1$ of element 1 select a width $w_M$ of element M select widths of elements 2 to M−1 to be between $w_1$ and $w_M$ so that $w_i$ decreases with increasing i distributing the elements over the length L thereby selecting their mutual distance $s_i$ calculating the total insertion loss of the branching unit by a numerical method, preferably a Beam Propagation Method varying the number of elements, their width and mutual distance in an iterative process, ending when a minimum in total insertion loss have been found.

Thereby it is ensured that an optical branching component with a low insertion loss and improved uniformity of the power distribution between the individual output waveguides is provided.

The optical branching component may advantageously be implemented in all planar waveguide systems such as silica-on-silicon, $LiNbO_3$, ion-exchange, silicon-on-insulator, III-V-systems and like.

When the length L is selected to be limited between the location of the joint between the output waveguide cores and the branching part and a location in the splitting region where the distance between the neighbouring diverging output waveguide cores is approximately 2 to 4 times the width $w_{out}$ of the output waveguide cores, it is ensured that the insertion loss is minimized.

An Optical Component Comprising Stress Relieving Structures:

An object of the present invention is to reduce the internal stress of the core region of a waveguide in an optical component, thereby reducing birefringence.

The objects of the invention are achieved by the invention described in the accompanying claims and as described in the following.

An optical component comprising a combination of planar waveguides on a substrate is provided, each waveguide comprising a core region pattern surrounded by lower and upper cladding layers, the core region pattern being formed in a layer applied to the lower cladding layer supported by the substrate and the upper cladding layer being applied to cover the core region pattern and the lower cladding layer, the combination of waveguides comprising spaced, parallel, diverging or merging waveguide core sections. The component comprises a stress relieving element located in the vicinity of the spaced, parallel, diverging or merging waveguide core sections.

It is an advantage of an optical component according to the present invention that it may be manufactured by PECVD, providing a potentially low cost, high-volume, reproducible and reliable component.

The term 'a stress relieving element' is in the present context taken to mean a structural element aimed at relieving stresses in the core region patterns. In an embodiment of the invention, the coefficient of thermal expansion of a stress relieving element is less than that of the cladding material e.g. less than 90% such as less than 80% such as less than 50%. In an embodiment of the invention, the stress relieving element or elements is/are made of the same material as the core region patterns. In an embodiment of the invention, the stress relieving element or elements are formed in the same structural layer as the core region patterns. In an embodiment of the invention, the stress relieving element or elements are formed in the same process step as the core region patterns. In an embodiment of the invention, the stress relieving element or elements is/are made of the same material and in the same process step as the core region patterns.

The term 'in the vicinity of' is in the present context taken to mean being positioned as close as possible relative to without substantially influencing the optical properties of the waveguide or waveguides around it (by not introducing substantial losses (such as larger than 1%) in the waveguide). In an embodiment, the distance between substantially parallel faces perpendicular to the substrate of waveguide and stress relieving elements is smaller than 15 μm, such as smaller than 10 μm, such as smaller than 5 μm.

The width and height of a waveguide is in the present context taken in a transversal cross section of the waveguide core (i.e. in a cross section perpendicular to the intended direction of light guidance of said waveguide cores at the location of a width measurement), the width being a dimension of the core region of the waveguide in question in a direction parallel to a reference plane defined by the opposing, substantially planar, surfaces of the substrate, the height being a dimension of the core region of the waveguide in question in a direction perpendicular to the reference plane (in a direction of growth). When comparing widths of waveguides and stress relieving elements and distances between them, it is anticipated that the width of a stress relieving element and the distance between a waveguide and a stress relieving element are taken in the same cross section and direction as the width of the waveguide in question. The width of a ridge (e.g. a waveguide) is generally taken as the largest width-dimension in the cross section in question (e.g.—but not necessarily—at the bottom of the ridge closest to the supporting layer). The width of a groove (e.g. the distance between waveguide core sections or between stress relieving structures or between waveguide core sections and stress relieving structures) is generally taken as the smallest dimension in the cross section in question (e.g. at the bottom of the ridge closest to the supporting layer).

In an embodiment of the invention, the width of a waveguide core is taken as the dimension defined by the corresponding mask used for generating the structure in question in the processing step forming the physical layout of the waveguide core and additional structures.

In an embodiment of the invention, the distance between opposite or neighbouring faces of the spaced, parallel, diverging or merging waveguide core sections—over a certain length—is less than the height of the waveguide core sections, such as less than half the height, such as less than 0.1 times the height of the waveguide core sections, the faces being substantially parallel to a direction of growth of the core layer.

In an embodiment of the invention, the distance between a waveguide and a stress relieving element is smaller than 15 μm, such as smaller than 10 μm, such as smaller than 5 μm.

In an embodiment of the invention, a stress relieving element is elongate and has a width that is less than or equal to the width of the nearest waveguide.

In an embodiment of the invention, the optical component comprises several parallel running stress relieving elements. This has the advantage of improving the uniformity of the strain field. In an embodiment of the invention, the distance between neighbouring stress relieving elements is less than 15 μm, such as less than 10 μm, such as less than 5 μm.

In an embodiment of the invention, a stress relieving element has width dimensions that are larger than the nearest waveguide.

In an embodiment of the invention, a stress relieving element has a form that substantially matches the space between two merging or diverging waveguide core sections. The actual geometry decides whether a solution with pads or elongate elements yields the better uniformity of the strain field which may be determined by simulation.

In an embodiment of the invention, the optical component comprises a branching element such as a coupler or a splitter.

In an embodiment of the invention, the optical component further comprises transversal elements formed in the waveguide core layer and connecting spaced, parallel, diverging or merging waveguide core sections.

The present invention further provides a method of manufacturing an optical component comprising a combination of planar waveguides on a substrate, the method being suitable for minimizing the internal stress of a waveguide and comprising the steps of
a) providing a substrate,
b) forming a lower cladding layer on the substrate,
c) forming a core layer on the lower cladding layer,
d) providing a core mask comprising a core region pattern corresponding to the layout of the core regions of waveguides of the component and a pattern of stress relieving elements in the vicinity of spaced, parallel, diverging or merging waveguide core sections,
e) forming core regions and stress relieving elements using the core mask, a photolithographic and an etching process, and
f) forming an upper cladding layer to cover the core region pattern, the stress relieving elements and the lower cladding layer.

In an embodiment of the invention, the substrate is a silicon substrate, and the core and cladding layers comprise silica.

In an embodiment of the invention, the upper cladding layer has a lower flow temperature than that of the core and the lower cladding layer. In an embodiment of the invention, the flow temperature of the upper cladding layer is adapted so that the waveguide core sections do not flow during an annealing that flows the upper cladding layer (at the anneal temperature and time in question). In an embodiment of the invention, the flow temperature (in ° C.) of the upper cladding layer is at least 10% lower than that of the core and the lower cladding layer such as at least 20% lower such as at least 50% lower. In an embodiment of the invention, the flow temperature of the upper cladding layer is at least 20° C. lower than that of the core and the lower cladding layer such as at least 50° C. lower such as at least 100° C. lower.

In an embodiment of the invention, the upper cladding layer comprises boron and/or phosphorus. In an embodiment of the invention the amounts of boron and phosphorus are in total larger than 3 weight % such as each larger than 1 weight %.

In an embodiment of the invention, the optical characteristics of the upper and lower cladding layers are similar. In an embodiment of the invention, the refractive index difference between the lower and upper cladding layers are less than 0.1% such as less than 0.05%, such as less than 0.01%.

In an embodiment of the invention, the formation of layers on the substrate is made by plasma enhanced chemical vapour deposition.

In an embodiment of the invention, step f) comprises successive deposition and annealing steps. The annealing process should be carried out at corresponding values of temperature and time allowing a stabilization of the glass structures. In an embodiment of the invention, the anneal temperature is between 800 and 1200° C., such as 1000° C.

An Optical Component Comprising Waveguides with Transversal Elements and/or Segmented Waveguides Aimed at Gap-filling:

The idea and hence the components are based on observations of which types of waveguide core structures that typically can—and which types cannot—be filled with upper cladding without the creation of voids.

It is observed, that typically long parallel closely spaced structures (precisely as in directional couplers) give rise to problems in the cladding deposition.

It is an object of the present invention to provide a scheme for filling out volumes around closely spaced, e.g. elongate, structural features such as parallel or merging ridges on a substantially planar supporting face (e.g. waveguide core features standing out on a cladding layer) without introducing air pockets in a deposition process.

The objects of the invention are achieved by the invention described in the accompanying claims and as described in the following.

An optical component comprising a combination of planar waveguides on a substrate is provided, each waveguide comprising a core region pattern surrounded by lower and upper cladding layers, the core region pattern being formed in a layer applied to the lower cladding layer supported by the substrate and the upper cladding layer being applied to cover the core region pattern and the lower cladding layer, the combination of waveguides comprising a length of at least two spaced waveguide core sections wherein transversal elements are arranged between said spaced waveguide core sections.

It is an advantage of an optical component according to the present invention that it may be manufactured by PECVD, providing a potentially low cost, high-volume, reproducible and reliable component.

In an embodiment of the invention, the at least two spaced waveguide core sections are essentially parallel. In an embodiment of the invention, the component is a coupler.

To break the long canal between such two parallel, closely spaced waveguide cores, a number of cross-bars is introduced into the space between the waveguide cores to ease the flow of cladding material during high-temperature treatments. The cross-bars may have another beneficial effect, namely that of stabilizing the waveguide structure against the stress which arises when the cladding material flows. Because of the movement of the cladding material (and also because of different thermal expansion coefficients), the surrounding material (i.e. the lower and upper cladding and the substrate) will tend to exert a pull in the cores. This pull will be counteracted by the cross-bars, which may reduce the birefringence in the coupler-structure.

In an embodiment of the invention, the transversal elements are made of the same material as the core region patterns. In an embodiment of the invention, the transversal elements are formed in the same structural layer as the core region patterns. In an embodiment of the invention, the transversal elements are formed in the same process step as the core region patterns. In an embodiment of the invention, the transversal elements are made of the same material and in the same process step as the core region patterns.

In an embodiment of the invention, at least one of the transversal elements physically connects to each of the spaced waveguide core sections. In an embodiment of the invention, each of the transversal elements physically connects to each of the spaced waveguide core sections.

In an embodiment of the invention, the optical component comprises two spaced, substantially parallel waveguide sections wherein the cross sections of the two waveguide sections and connecting transversal elements when viewed in a planar cross section (perpendicular to a direction of growth or deposition of layers) are mirror symmetric around an axis midway between the centre axes of the two waveguide sections.

In an embodiment of the invention, the transversal waveguide core elements of a waveguide section are angled compared to an intended direction of light transmission of the waveguide section to minimize back-reflections.

In an embodiment of the invention, the spaced waveguide core sections are segmented, each comprising a number of waveguide core pieces separated by a space filled with upper cladding material.

In an embodiment, a waveguide core section and a transversal element connect at an angle larger than 45° such as larger than 60° such as larger than 80°, such as around 82°.

In an embodiment of the invention, the optical component comprises a stress relieving element located in the vicinity of spaced, parallel, diverging or merging waveguide core sections.

It has been observed that the object of the invention may be achieved by an alternative solution as discussed in the following.

An optical component comprising a combination of planar waveguides on a substrate is provided, each waveguide comprising a core region pattern surrounded by lower and upper cladding layers, the core region pattern being formed in a layer applied to the lower cladding layer supported by the substrate and the upper cladding layer being applied to cover the core region pattern and the lower cladding layer, the combination of waveguides comprising spaced, parallel, diverging or merging waveguide core sections wherein said spaced, parallel, diverging or merging waveguide sections comprise segmented sections comprising a number of separate waveguide core pieces.

The term 'segmented' is in the present context taken to mean non-continuous, i.e. a segmented waveguide comprises physically unconnected waveguide core pieces. A segmented waveguide section comprises a number of waveguide core pieces separated by a space filled with upper cladding material.

In an embodiment of the invention, the optical component comprises at least two spaced waveguide core sections which are essentially parallel over a certain length. In an embodiment of the invention, the component is a coupler.

In an embodiment of the invention, each waveguide core piece is quadrilateral. In an embodiment of the invention, each waveguide core piece has four edges when viewed in a planar cross section, the edges constituting two and two parallel opposing edges, i.e. together constitute a parallelogram.

In an embodiment of the invention the optical component comprises an optical coupler comprising two waveguides having—over a certain length—substantially parallel sections of waveguides that diverge from each other at both ends of the parallel sections.

In an embodiment of the invention, the cross sections of the two substantially parallel waveguide sections, when viewed in a planar cross section, are mirror symmetric around an axis midway between the centre axes of the two waveguide sections, i.e. each waveguide segment in the first waveguide has its corresponding segment in the second waveguide which is the mirror image of the waveguide segment in the first waveguide.

In an embodiment of the invention, the spacing between each waveguide segment is identical for all segments. In an embodiment of the invention, the spacing between segments is less than 2 μm, such as less than 1 μm, such as less than 0.5 μm.

In an embodiment of the invention comprising two spaced waveguide sections, the angle of a parallelogram defining a waveguide piece as defined by an edge of one waveguide section facing the other waveguide section and the first edge encountered by light propagated in the intended direction of light transmission is larger than 90°, expressed as 90°+α.

In an embodiment of the invention, the transversal waveguide elements meet the corresponding waveguide segments at an angle substantially equal to 90−α.

In an embodiment of the invention, the angle α is around 8°.

In an embodiment of the invention, the optical component comprises transversal waveguide core elements between segmented waveguide sections.

In an embodiment of the invention, the transversal waveguide core elements of a waveguide section are angled compared to an intended direction of light transmission of the waveguide section.

In an embodiment of the invention, the transversal waveguide elements meet the corresponding waveguide segments at an angle substantially equal to 90−α. In an embodiment of the invention, the angle α is around 8°.

In an embodiment of the invention, the optical component comprises a stress relieving element located in the vicinity of spaced, parallel, diverging or merging waveguide core sections.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with an embodiment and with reference to the drawings in which:

FIG. 21 shows a sketch of a traditional directional coupler with two separate waveguides closely spaced over a length $L_{CR}$ (the coupling length), FIG. 22 schematically shows two waveguides forming a directional coupler;

FIG. 22.$a$ shows a situation where the two waveguides are perfectly covered, and FIG. 22.$b$ shows a situation where the two waveguide cores are too closely spaced and the structure cannot be perfectly filled resulting in void formation between the two cores, FIG. 23 shows a segment coupler according to the invention (type A) having N angled cross-bars of the width W and the distance between neighbours of S positioned in the space between the two waveguide cores.

The figures are schematic and simplified for clarity, and they just show details which are essential to the understanding of the invention, while other details are left out. Throughout, the same reference numerals are used for identical or corresponding parts.

MODE(S) FOR CARRYING OUT THE INVENTION

Figure 1:
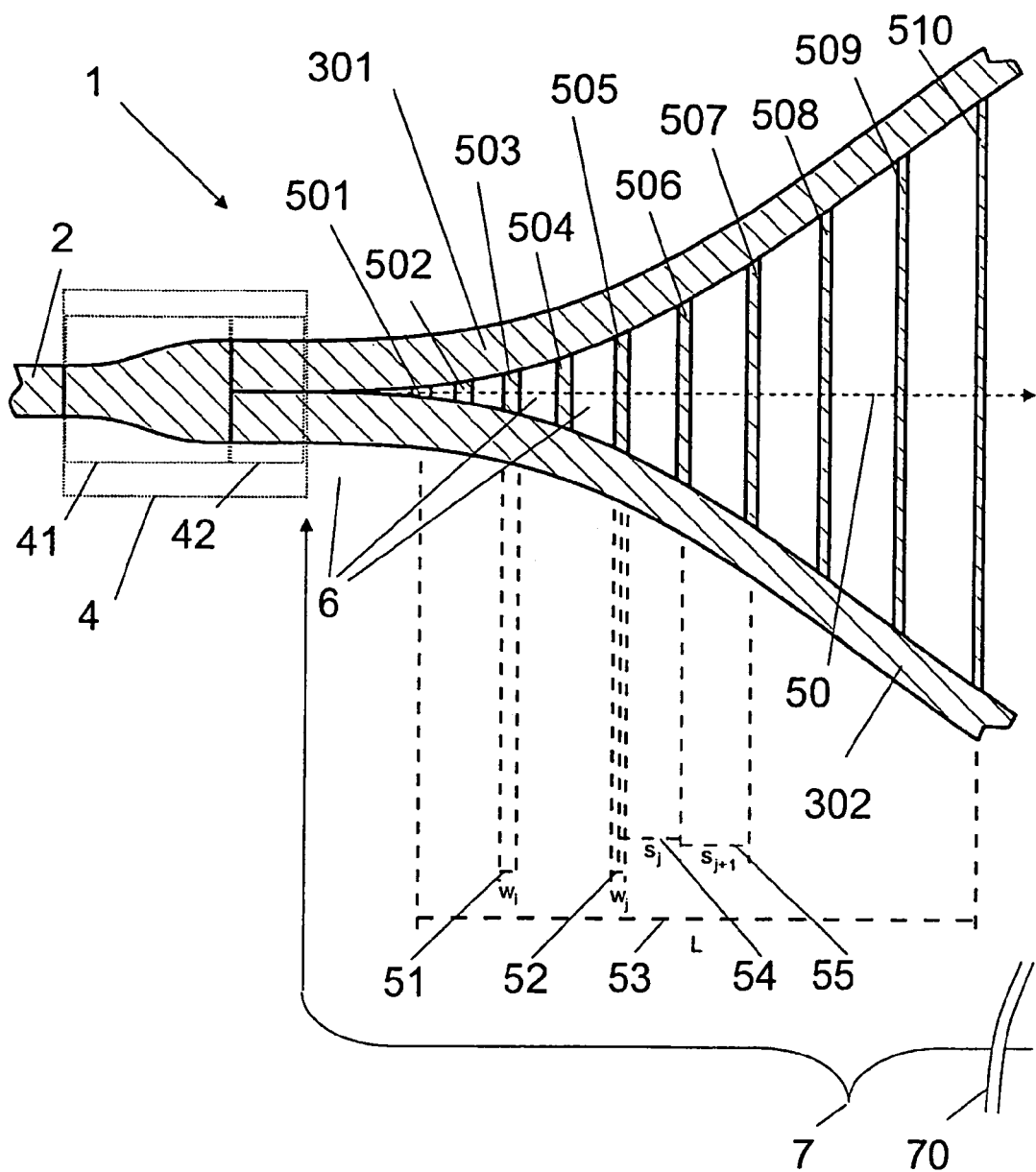
FIG. 1 shows a schematic partial view of a splitter according to the invention, wherein a number of transversal elements of varying width and position are inserted between the two output waveguide arms.

Loss Reduction in a Splitter:

FIG. 1 shows a schematic partial view of a 1-2 or Y-splitter 1 according to the invention, wherein a number of transversal elements 501, 502, 503, 504, 505, 506, 507, 508, 509, 510 of varying width and position are inserted between the two output waveguide arms 301, 302. The splitter comprises an input core 2, and two output cores 301, 302 connected by a branching part 4 having core refractive index and consisting of a tapered section 41 which adiabatically adapts the width of the input core to that of the sum of the two sideways abutted output core widths and an abutting section 42 in which the output cores abut each other over a certain length before they diverge in path into the splitting region 7. Alternatively, the two output waveguides may overlap in the (possibly tapered) branching part (cf. 4 in FIG. 5.$b$). Alternatively, the two output waveguides may overlap in the abutting section 42 and may also be tapered. The transversal elements, having core refractive index, are located in the splitting region 7, i.e. the area between the two output waveguides from the Y-splitter, where the waveguides diverge from each other (as in FIG. 1). Alternatively the locations of transversal elements may extend into the area between the output waveguides where they run in parallel (the parallel region, cf. 8 in FIGS. 5.$a$ and 5.$b$). The signature 70 indicates that the splitting region 7 is continued over a larger distance than shown in FIG. 1.

Figure 7:
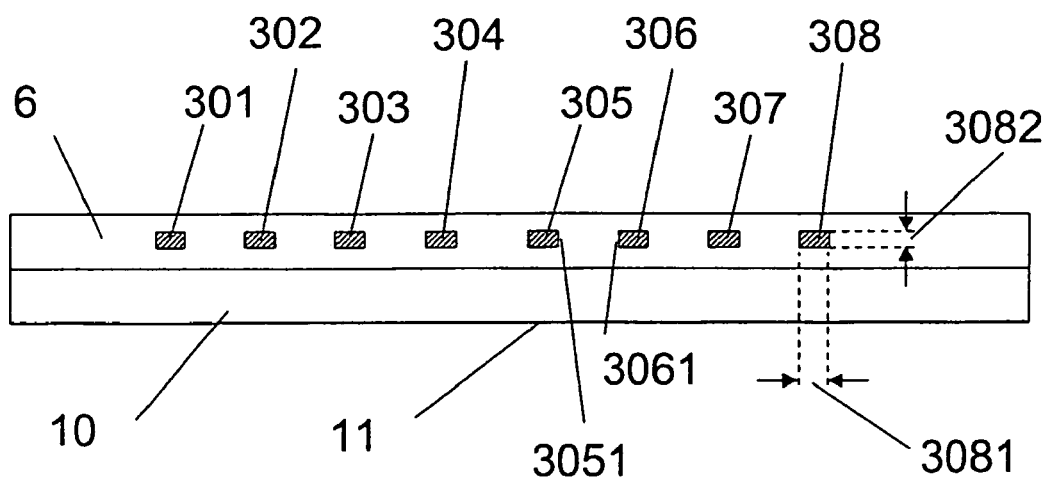
FIG. 7 shows a schematic cross sectional view of a branching element according to the invention formed on a substrate with 8 output core waveguides embedded in a cladding.

The input waveguide core 2, the output waveguide cores 301, 302, the branching part 4 and the transversal elements 501-510 all have identical core refractive index and are embedded in a cladding 6, all formed on a substrate (cf. 10 in FIG. 7).

In the processing of the device, the transversal elements are defined simultaneously with the waveguide structure. The j'th element has a width 52 of $w_j$ and the separation 54 to the following element is $s_j$. The length 53 in the output direction 50 over which the elements are placed is denoted by L.

The effect of these transversal elements is to give rise to an "average/effective refractive index". Where in the beginning the elements are wide and closely spaced, the "average/effective refractive index" is close to the core refractive index. Seen towards the right—in the output direction 50—the widths of the elements are reduced (cf. e.g. the widths 51 ($w_i$) of the i'th element and 52 ($w_j$) of the j'th element) and the separation of the elements is increased (cf. e.g. the separation 54 ($s_j$) between the j'th and the (j+1)'th element and 55 ($s_{j+1}$) between the (j+1)'th and the (j+2)'th element). This in turn gives rise to a lower "average/effective refractive index" that converges towards the cladding refractive index. After the length L (as counted from the location of the first element), the transversal element structure is terminated, L being the sum of the individual separation distances $s_i$.

Figure 2:
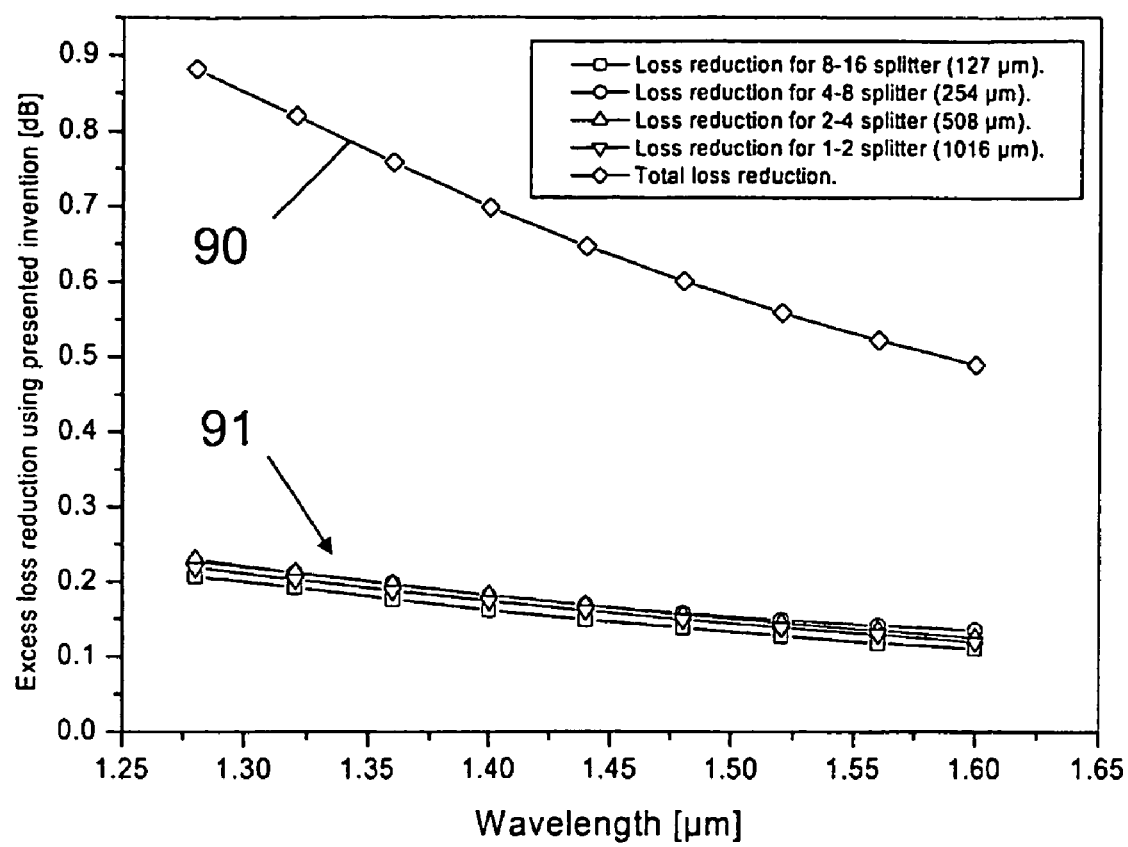
FIG. 2 shows the wavelength dependence of the total loss reduction and the loss reduction for four different splitter designs in a 1-16 splitter tree, each having been optimized individually according to the invention compared to corresponding designs without the transversal element structure.

FIG. 2 shows the dependence of the wavelength λ of the total loss reduction 90 and the loss reduction 91 (cf. notation on the figure) for four different splitter designs in a 1-16 splitter tree (cf. FIG. 6), each having been optimized individually according to the invention compared to corresponding designs without the transversal element structure.

In order to find the optimum distribution of the transversal elements, their widths and the length L it is necessary to use iterative calculations. This iteration is done by in turn varying the individual parameters, and then calculate the insertion loss for the component. This has been done for a 1-16 splitter design, and is depicted in FIG. 2. As appears from FIG. 2, the total loss reduction 90 varies almost linearly with wavelength in the range between 0.5 dB ($\lambda$=1.60 µm) and 0.9 dB ($\lambda$=1.26 µm). The loss reduction per splitter 91 correspondingly vary between approximately 0.1 and 0.2 dB in the same wavelength range between 1.26 and 1.60 µm.

Figure 3:
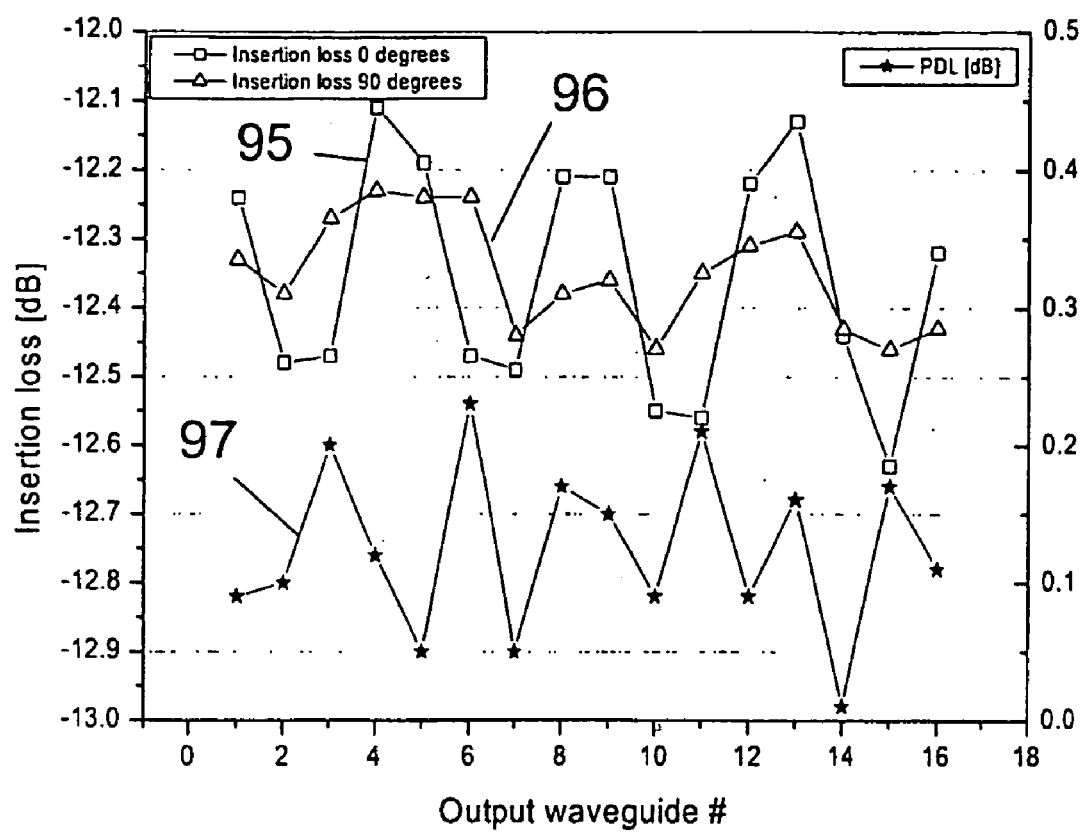
FIG. 3 shows measured insertion loss for vertically and horizontally polarized light as well as the polarization dependent loss for a 1-16 splitter tree according to the invention.

FIG. 3 shows measured insertion loss for vertically 95 and horizontally 96 polarized light as well as the polarization dependent loss 97 for a 1-16 splitter tree according to the invention.

Each of the four splitter designs constituting a 1-16 splitter tree have been optimized individually over the wavelength range typically of interest. The loss reduction for the four new designs have been calculated, compared to the old designs without the transversal element structure in the splitting region, as well as the total loss reduction. In FIG. 3 measured insertion losses for light polarized 0° and 90° with respect to vertical, as well as the polarization dependent loss (PDL=abs($Loss_0°$−$Loss_{90}°$)) are shown. As appears from FIG. 3, PDL 97 varies between 0.05 and 0.23 dB for the 16 outputs. The insertion losses for light polarized 0° 95 vary between −12.1 and −12.5 dB, whereas the insertion losses for light polarized 90° 96 vary between −12.23 and −12.46 dB for the 16 outputs.

Figure 4:
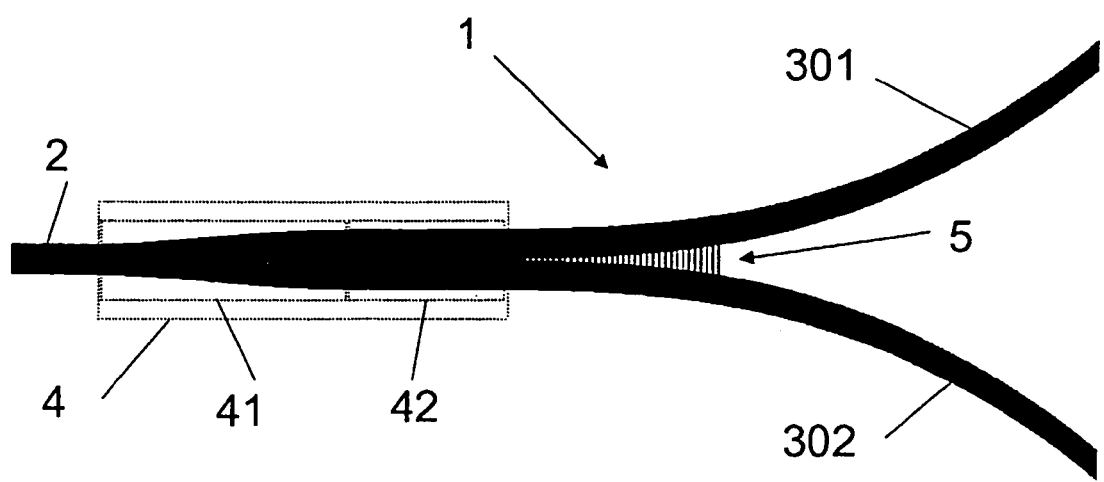
FIG. 4 shows an example of an actual layout of an Y splitter according to the invention, FIGS. 5.a and 5.b show examples of 2-4 branching units according to the invention.

FIG. 4 shows an example of an actual layout of a Y splitter 1 according to the invention. The input 1 is connected to the branching part 4—comprising a tapered part 41 and an abutting part 42, the latter consisting of the two abutted ends of the output waveguide cores 301, 302. A number (more than 30) of transversal elements 5 are inserted between the output waveguide cores over a length of the splitting region starting from the right after the abutting part. In determining the location of the first transversal element following the abutting part in the output direction, the flow properties of the materials in question must be considered including the possibility to fill the relatively small area (volume) between the abutting part and the first transversal element with cladding material.

FIGS. 5.a and 5.b show examples of 2-4 branching units according to the invention. The device consists of a X %:(100-X)% field coupler followed by two 1-2 splitters according to the invention. It is preferred that X is independent of wavelength and preferably 50. This can be obtained by proper design of the directional coupler, see, e.g. J. D. Love et al. Electron. Lett. 30 (1994) 1853-1854 or A. Takagi et. al. Electron. Lett. 26 (1990) 132-133.

FIGS. 5.a and 5.b show a 2-4 branching unit 101 comprising a field coupler 210 having two inputs 211, 212 and two outputs that serve as inputs to two identical 1-2 splitters with inputs 21, 22 joined by a branching part 4 to outputs 301, 302 and 303, 304, respectively with transversal waveguide core elements 5 connecting the respective output waveguide cores over a fraction of the length of the splitting region 7. The output waveguides run in parallel in the output direction 50 (defined by the direction of light guidance of the input waveguide) over a certain length in the parallel region 8.

In the branching unit of FIG. 5.a, the 2 outputs 301, 302 of an 1-2 splitter are sideways abutted in an abutting part 42 of the branching part 4 joining the input 21 and output 301, 302 waveguide cores. A tapered part 41 adiabatically adapts the combined width of the two output waveguide cores to the width of the input waveguide core.

FIG. 5.b show a corresponding 2-4 branching unit 101 having the same structure as the branching unit in FIG. 5.a apart from the branching part 4 of the 1-2 splitters, which in FIG. 5.b consists of a simple Y-structure resembling the points of a train railway, i.e. having one input gradually splitting into 2 outputs, the inputs and outputs having identical 'track-widths').

Figure 6:
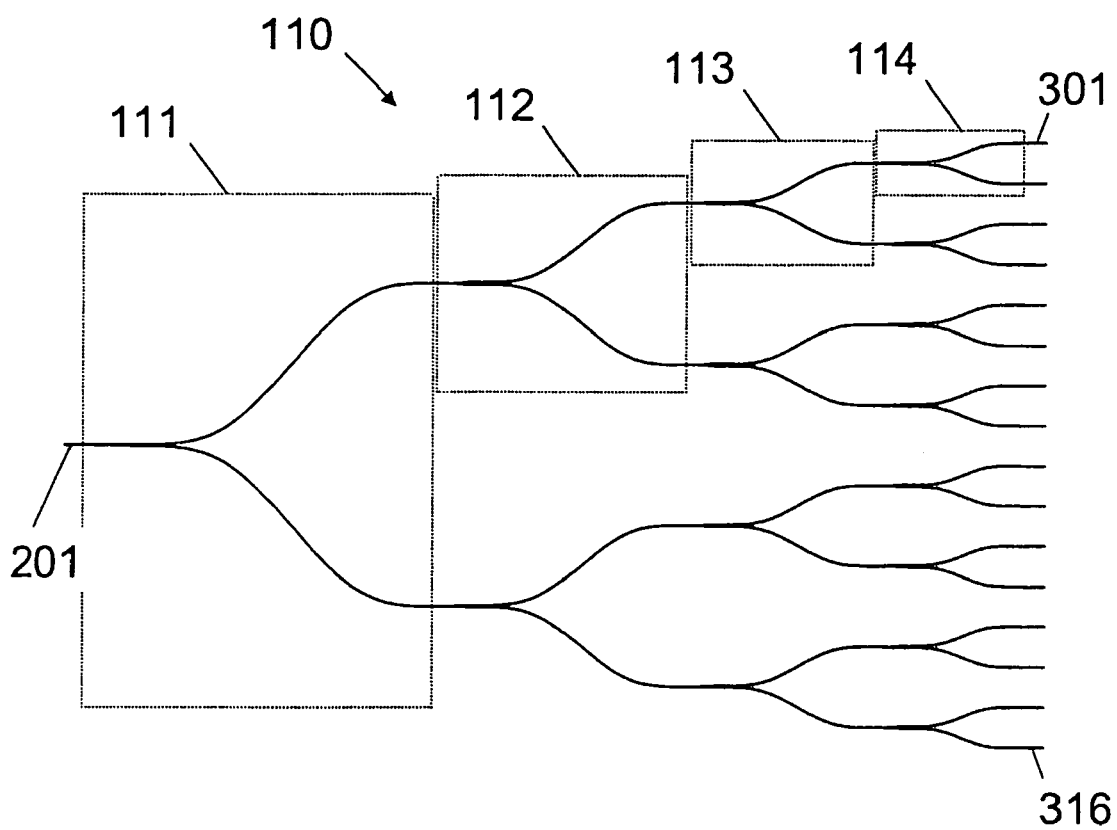
FIG. 6 shows an example of a 1-16 splitter according to the invention.

FIG. 6 shows an example of a 1-16 splitter according to the invention. The branching unit is composed of 1-2 Y-splitters in a splitter tree. Each 1-2 splitter is provided with a number of transversal waveguide core elements connecting the 2 output waveguide cores. The loss reduction for individual parts of the 1-16 splitter is shown in FIG. 2.

The splitter tree of the 1-16 branching unit 110 of FIG. 6 comprises an input 201 and 16 outputs 301-316 (the reference numbers of the 14 outputs between 301 and 316 are not indicated). The inputs and outputs are joined by a splitter tree comprising 1-2 splitters at 4 levels as represented by 1-2 splitters 111, 112, 113, 114, each 1-2 splitter comprising transversal output waveguide core elements inserted for optimum insertion loss. The layout of each individual splitter may be optimized with respect to a minimum return loss. Alternatively (or additionally), the insertion loss of the whole layout may be minimized in an iterative process by variation of the design parameters for the component, including the number, location, path, width and separation of the transversal waveguide core elements of each 1-2 splitter.

FIG. 7 shows a schematic cross sectional view of a branching element according to the invention formed on a substrate with 8 output core waveguides embedded in a cladding. FIG. 7 shows a cross section of a planar waveguide structure according to the invention. The cross section is taken perpendicular to the intended direction of light guidance of the waveguides. The waveguide structure comprises a substrate 10, e.g. a silicon wafer, defining a reference plane 11. The substrate carries a number of waveguides for guiding light comprising a cladding layer 6 in which waveguide core elements 301-308 are embedded. The waveguide core elements have a rectangular cross section (within processing tolerances), the width being taken in a direction parallel to the reference plane 11 as indicated by 3081 for waveguide core 308. The thickness of the waveguide core is given by its dimension in a direction perpendicular to the reference plane 11 as indicated by 3082 for waveguide core 308. The thickness is controlled by the thickness of the core layer during processing. The 8 waveguide core cross sections of FIG. 7 may illustrate the 4×2 outputs of 4 1-2 splitters in a 1-8 branching unit, i.e. (301, 302) and (303, 304) and (305, 306) and (307, 308) constituting output waveguide pairs as seen in a cross section of the parallel region. The opposing edges of two neighbouring output cores may be represented by edges 3051 and 3061 of output waveguide core pair (305, 306).

Figure 8:
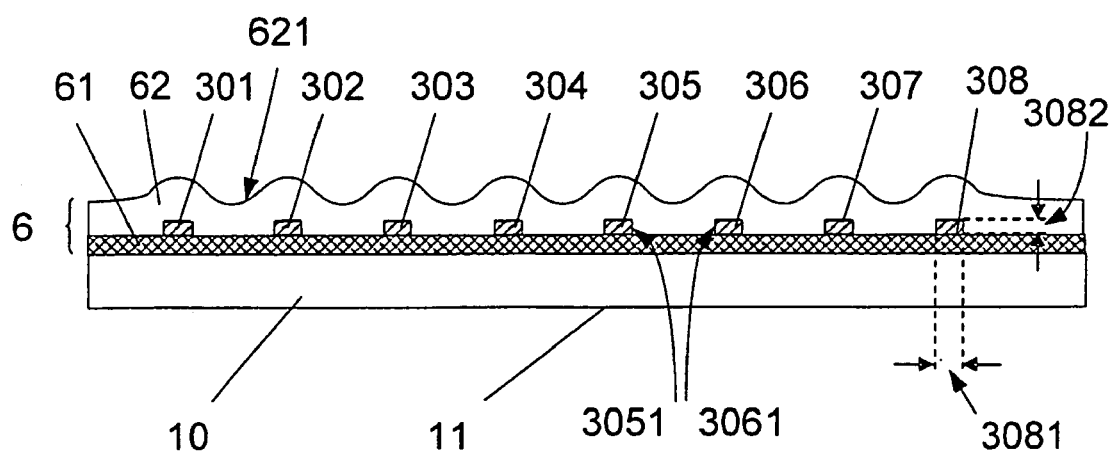
FIG. 8 shows a schematic cross sectional view of a branching element according to the invention comprising a lower cladding layer formed on a substrate with 8 output core waveguides applied to the lower cladding layer and covered by an upper cladding layer.

FIG. 8 shows a schematic cross sectional view of an optical component according to the invention. The component is essentially identical to that of FIG. 7. In FIG. 8, however, the cladding layer 6 is detailed to show a lower cladding layer 61 formed on a substrate 10 with 8 output waveguide core sections 301-308 applied to the lower cladding layer 61, the waveguide core sections and the parts of the lower cladding layer not being covered by the waveguide core pattern is covered by an upper cladding layer 62. Additionally the upper cladding layer 62 is shown to have a corrugated surface 621 due to repeated deposition and annealing steps leading to reflow of the upper cladding layer (the amplitude is exaggerated in the drawing). The upper cladding layer has a lower flow temperature than that of the core and lower cladding layers, controlled by proper addition of boron, phosphorus and/or fluorine (or any other dopants that reduces the flow temperature) to the upper cladding layer. The control of the cladding reflow properties is e.g. described in R. A. Levy, K. Nassau, "Reflow Mechanisms of Contact Vias in VLSI Processing", J. Electrochem. Soc., Vol. 133, No. 7, p. 1417 (1986), which is incorporated herein by reference.

Figure 9:
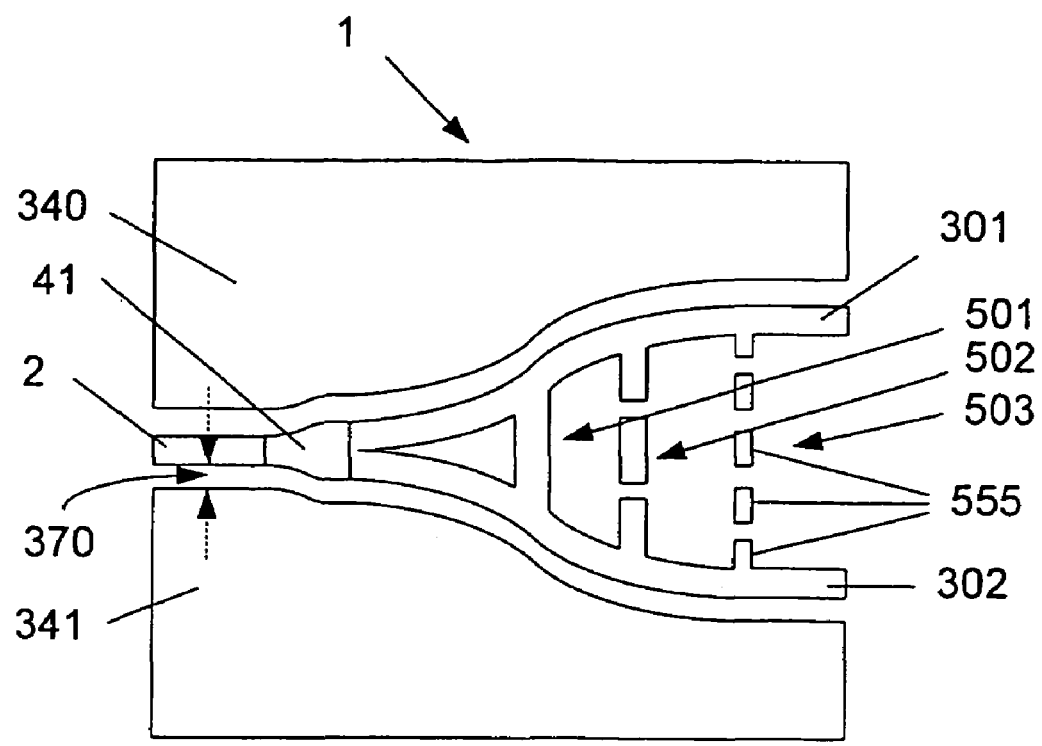
FIG. 9 shows a schematic partial view of a 1 to 2 splitter according to the invention, the splitter comprising transversal segmented elements and stress relieving structures.

FIG. 9 shows a one to two splitter 1 comprising an input waveguide core section 2 and output waveguide core sections 301, 302 separated by a branching part comprising a tapered branching element 41. The branching element 41 adapts the width of the input core to that of the sum of the two sideways abutted output core sections. Between the output core sections a number of transversal elements 501, 502, 503 are positioned. Some of the transversal elements 502, 503 are segmented, i.e. comprise individual pieces of core material 555 separated by a space filled with upper cladding material. The transversal elements are parallel, have decreasing width, increasing mutual distance and comprise an increasing number of segments with increasing distance from the splitting point (i.e. the point at the branching part where the two output waveguides separate away from each other). Stress relieving structural elements in the form of pads 340, 341 enclose the outer edges of the waveguide core sections of the component. The distance 370 between the neighbouring edges of, respectively, the waveguide core sections (including the branching part) and the stress relieving pads is around 10 μm.

Figure 10:
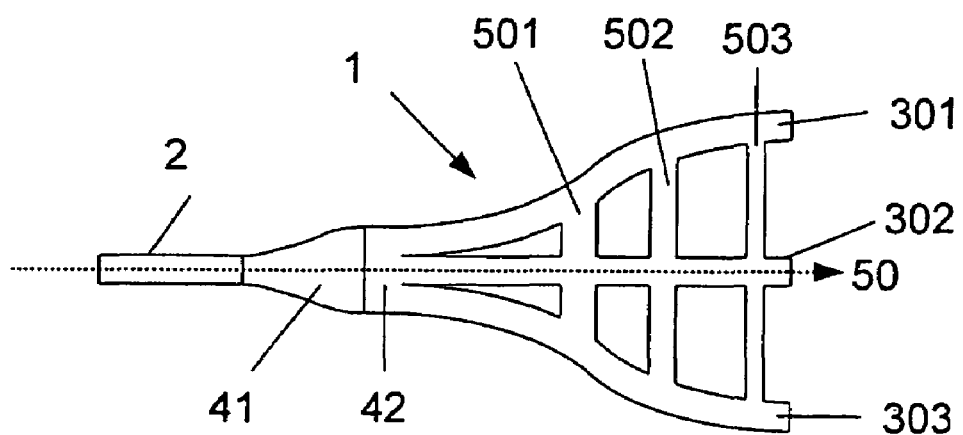
FIG. 10 shows a schematic partial view of a 1 to 3 splitter according to the invention, the splitter comprising transversal elements of varying width and position between the output waveguide arms.

FIG. 10 shows a schematic partial view of a one to three splitter 1 according to the invention. The splitter 1 comprises an input waveguide core section 2 and output waveguide core sections 301, 302, 303 separated by a branching part 41, 42 comprising a tapered branching element 41 and an abutting section 42. The branching element 41 gradually adapts the width of the input core to that of the sum of the three sideways abutted output core sections. A number of transversal elements 501, 502, 503 are positioned. between the three output core sections 301, 302, 303, the width of the transversal elements decreasing and their mutual distance increasing in the direction of light propagation from input to output as indicated by the arrow 50.

EXAMPLE 1

Fabrication of Splitter According to the Invention

In the following a description of one method to fabricate a branching device according to the invention will be presented.

First, the core geometry and refractive index difference between core and cladding materials should be fixed. For applications in telecommunications it is advantageous that there is as little as possible insertion loss between the input-/output fibres and the component as well as back-reflections from the fibre-component interface. Low insertion loss and low back-reflection is achieved by matching the integrated waveguide structure to the fibres in geometry as well as in refractive indices of the core and cladding materials. In telecommunication systems typically the Corning SMF-28 or equivalent fibres are used. Using a commercial numerical mode solver, such as the commercially available Selene from C2V, Enschede, The Netherlands, a suitable combination of core dimensions and refractive indexes is found. For good polarization dependence the core cross-sectional shape is typically quadratic. Now, given the core cross-sectional shape and refractive index difference the minimum bending radius (radius of curvature) of the splitter output arms can be estimated using e.g. semi-analytical expressions or better numerical BPM (Beam Propagation Method) methods. The minimum radius of curvature should be large enough that only a negligible amount of light is radiated out of the waveguide bend, but not too large as this yields a large and space consuming component.

It is advantageous, but in no way necessary, to have a tapering region in front of the two parting waveguides as this can reduce transition-/radiation loss from the initial straight waveguide to the bending waveguides.

When the various parts that constitute the traditional splitter have been chosen to yield a low-loss splitter, the transversal waveguide elements in the splitting have to be determined.

One method to determine the placement of the transversal elements is to first choose the length of the transition region L. L should be large enough that the loss is minimized but not larger than necessary since the remaining transversal waveguide elements will slightly scatter light from the cores and do not contribute to confining the light to the core. As a rule of thumb L should be chosen such that the inner edge-to-edge distance between the bending waveguides is approximately 2-4 times the waveguide core width.

When L is determined the transversal waveguide elements can be placed in a multitude of ways, however, the width (in the horizontal direction) should preferably decrease. This could be done e.g. by choosing a maximum (start) width, a minimum (end) width and a number M of elements, and then let the width $w_i$ and the mutual distance $s_i$ be a function of i, where i=1,2, . . . , M.

After the elements have been placed in the design, the total loss is calculated using a numerical method e.g. using BPM, e.g. the commercially available Prometheus from C2V, Enschede, The Netherlands. The widths, spacings and the number N are subsequently varied iteratively and the loss is calculated. When a minimum is found the iterations are ended.

EXAMPLE 2

A Variable Optical Attenuator According to the Invention

A VOA is an important device in network management for levelling multiple wavelength signals. It can be realised by combining two 1-2 splitters in a Mach-Zehnder geometry. The phase difference between light that propagates in the two arms can, e.g., be controlled by the thermo-optic effect by means of a heater element on one of the arms. Thereby the output intensity can be controlled. The advantage of the present invention is that the un-attenuated signal has low loss. Moreover, because of the better uniformity of the splitting ratio, a larger dynamic attenuation range can be expected (more than 25 dB attenuation).

Figure 11:
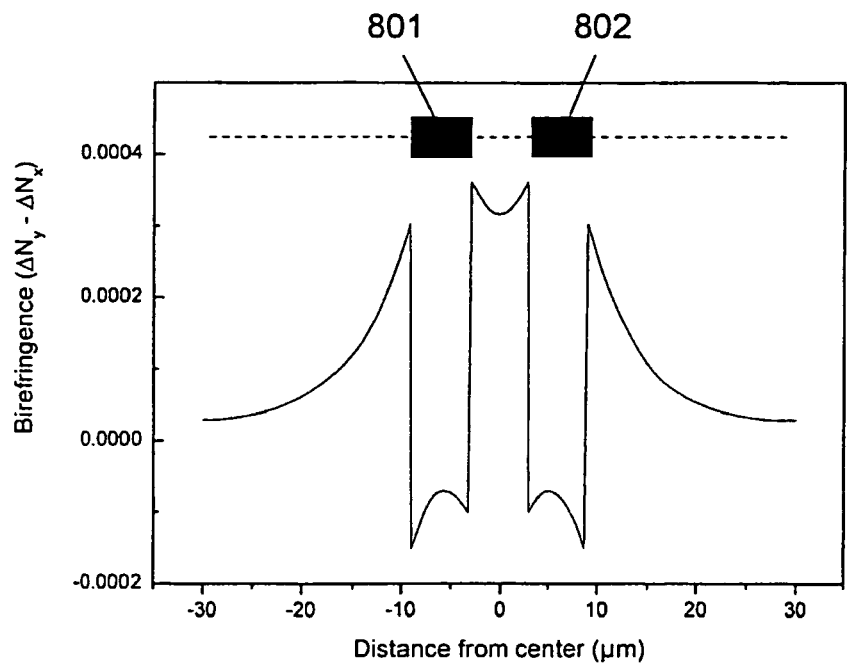
FIG. 11 shows a typical birefringence effect at the centre of the waveguide cores for a directional coupler, the black rectangles indicating the position of the cores and the dashed line where the birefringence is calculated.

Stress Relieving Structures:

The stress field across a coupler region is shown in FIG. 11, represented by the birefringence in the centre of the core region. $\Delta N_y$, $\Delta N_x$ represents the change of refractive index N in, respectively, the width (y) and height (x) directions, of a waveguide core section between the anneal temperature and room temperature. As can be seen there is a noticeable asymmetry of the birefringence in the waveguide cores (the position of the cores in a cross section perpendicular to the intended direction of light propagation of the waveguides are indicated by the black rectangles 801, 802). This asymmetry is believed to be one of the causes for un-predicted polarization issues with directional couplers. To make this birefringence more uniform, stress relieving structures are added on the outside of the coupler waveguides.

Figure 12:
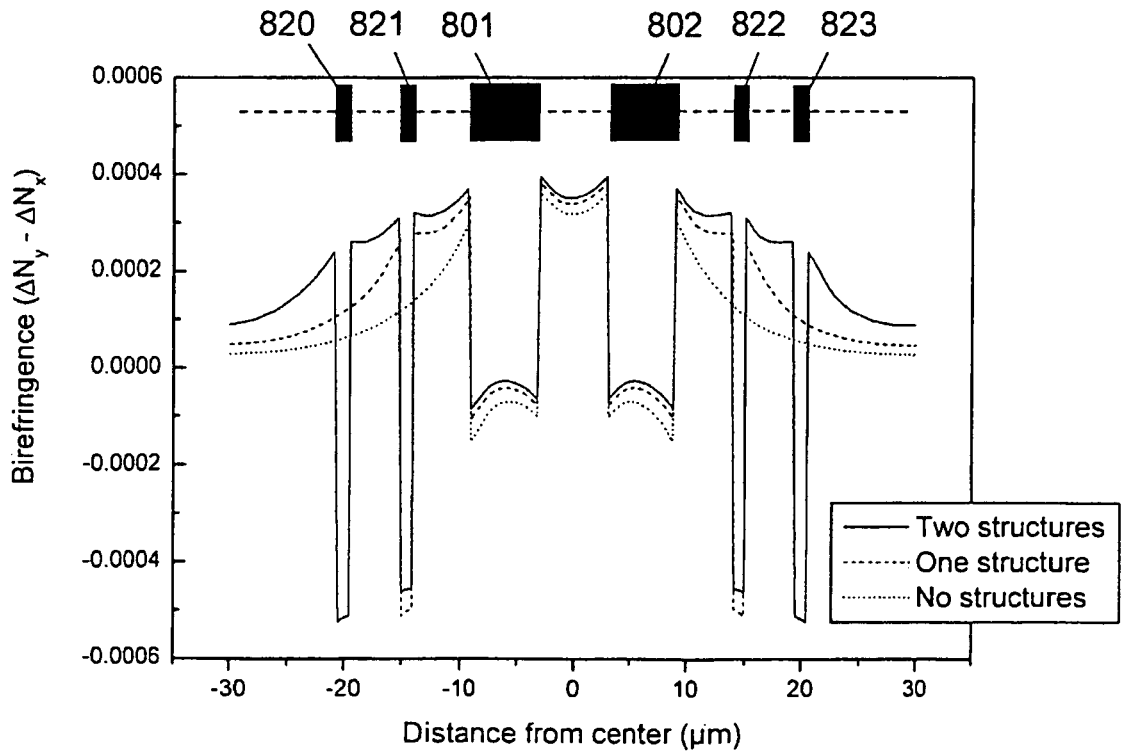
FIG. 12 shows a birefringence calculation for one and two stress relieving structures next to the cores, the stress relieve structures being 1 µm wide.

FIG. 12 shows the effect of adding one and two structures (821, 822 and 820, 823, respectively) of 1 μm width at each side of the 6 μm wide and 6 μm high coupler waveguides 801, 802, the coupler waveguides being spaced 6 μm apart (edge-to-edge). The edge-to-edge distance between a waveguide and its nearest stress relieving structure is 5 μm and between two stress relieving structures likewise 5 μm. The refractive indices of the waveguide core and cladding should be suitable for sustaining an optical mode, e.g. substantially constant (step index profile), preferably $n_{core}$=1,4520 and $n_{clad}$=1,4450 at λ=1550 nm.

Figure 13:
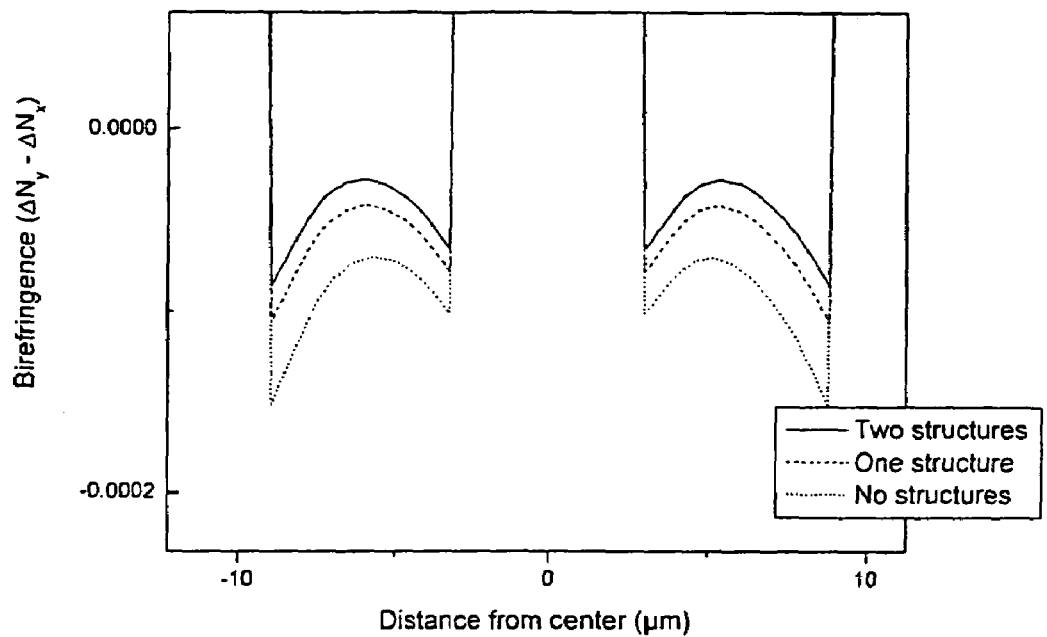
FIG. 13 shows a close-up of the core birefringence area from FIG. 12, the asymmetry in the birefringence being reduced by applying stress relieving structures.

FIG. 13 is a close-up of the birefringence in the coupler waveguides. It is clearly seen, that adding the stress relieving structures makes the birefringence more uniform. This is an indication of a more uniform strain field across the waveguides.

The width of the stress relieving grooves between a waveguide core section and a stress relieving structure must be chosen such that no or little light is coupled from the waveguides and into the relieving structures. The stress relieving structures can also be designed as large pads that are positioned with an appropriate distance to the couplers, e.g. around 10 μm.

Figure 14:
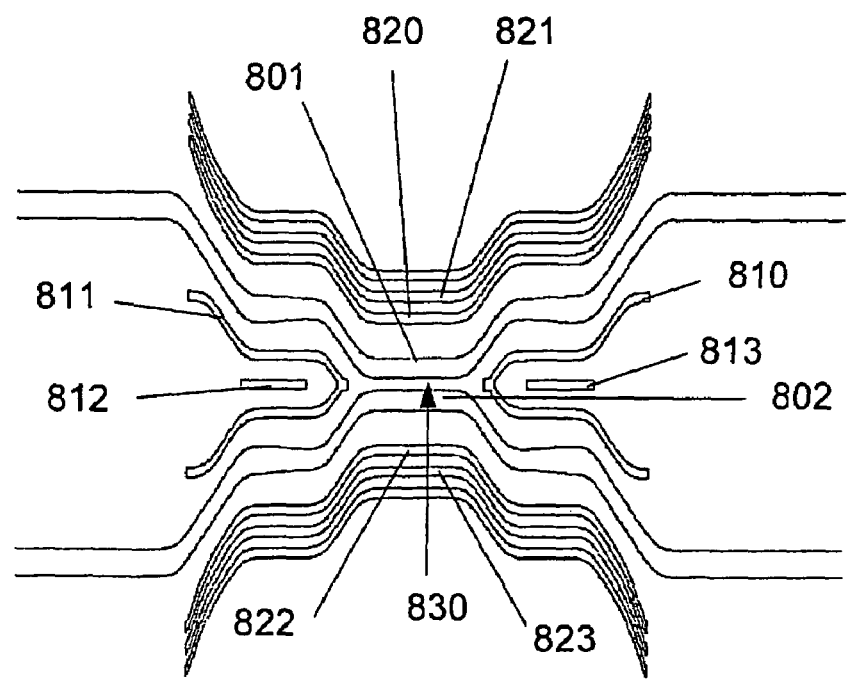
FIG. 14 shows an embodiment of the stress relieving structures wherein the wide structures are the waveguides and the narrow structures are the stress relieving structures.

An embodiment of a waveguide coupler according to the invention is shown in FIG. 14. Here the wide lines 801, 802 are the waveguide core structures and the narrow lines 810, 811, 812, 813, 820, 821 822, 823 are the stress relieving structures. The stress relieving structures are positioned around the waveguides in the whole coupling region 830 (the central part where the waveguides are closest). This will give a more uniform strain field. The stress relieving structures will additionally have the advantage that the so-called gap-filling will be easier. This means that void formation in the process of depositing and reflowing the top-cladding will be eliminated.

Figure 15:
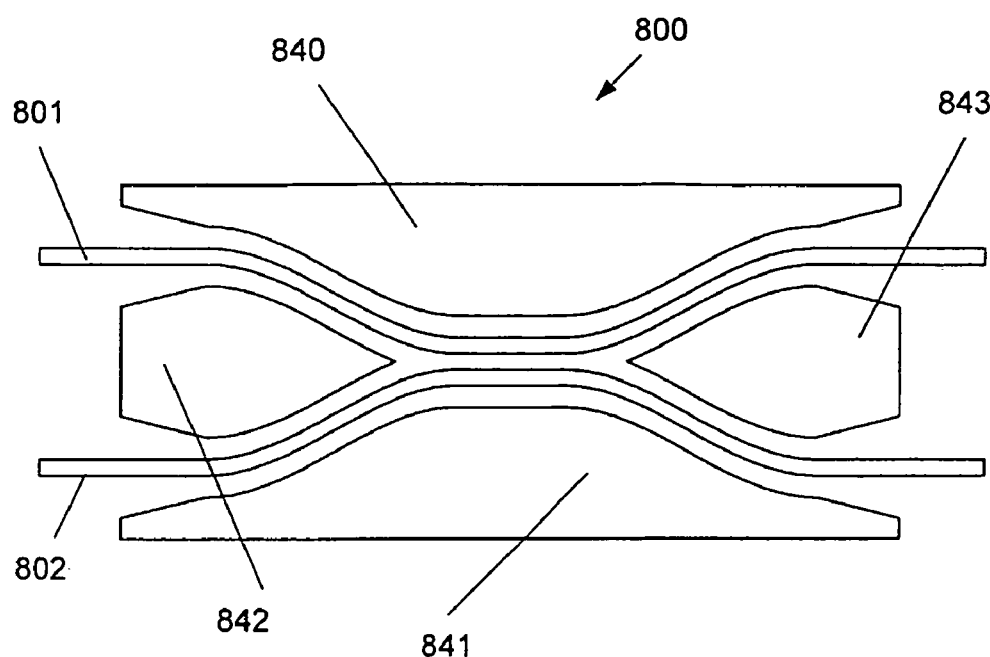
FIG. 15 shows another embodiment of the stress relieving structures wherein the upper part has pads close to the coupler structures.

Another embodiment of a waveguide coupler 800 according to the invention is shown in FIG. 15. Here the stress relieving structures are designed as large pads 840, 841, 842, 843. The pads essentially fill out the (otherwise) open space between the waveguide core pattern of the coupler. The distance from a pad 840 to a core 801 is in this case approximately 10 μm.

Figure 16:
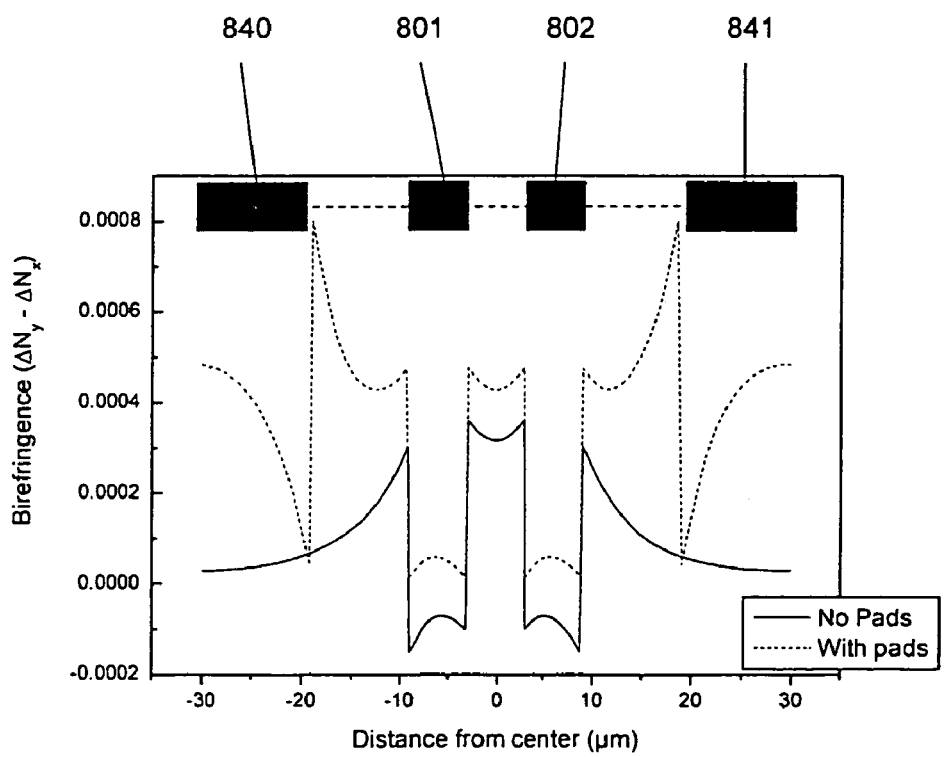
FIG. 16 shows a birefringence calculation for coupler structures with pads next to the cores.

FIG. 16 shows the birefringence for a coupler as depicted in FIG. 15 with and without the stress relieving pads (cf. 840, 841, 842, 843 of FIG. 15). Also here, it is clear that the birefringence asymmetry in the cores is reduced by the inclusion of the pads.

Figure 17:
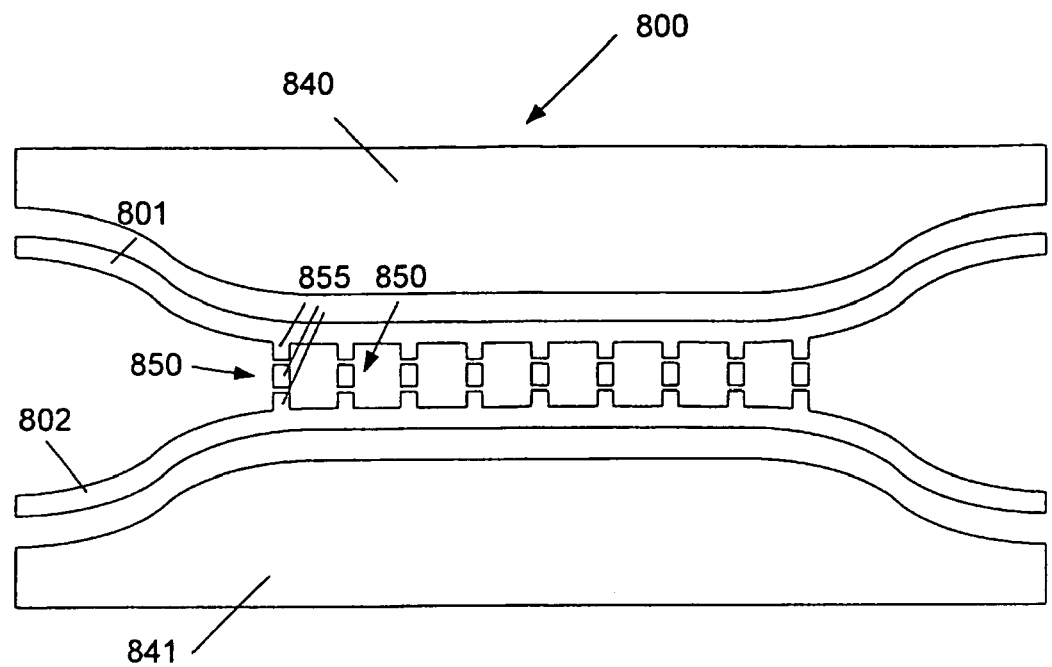
FIG. 17 shows a coupler according to the invention comprising stress relieving pads and segmented transversal elements over the coupling length.

FIG. 17 shows a coupler 800 according to the invention comprising stress relieving pads 840, 841 and segmented transversal elements 850 extending between the waveguide core sections 801, 802 over the coupling length. Each of the transversal elements 850 comprise a number of individual core segments 855 separated by a space filled with upper cladding material. The distance from a pad 840 to a core 801 is in this case approximately 15 μm.

Figure 18:
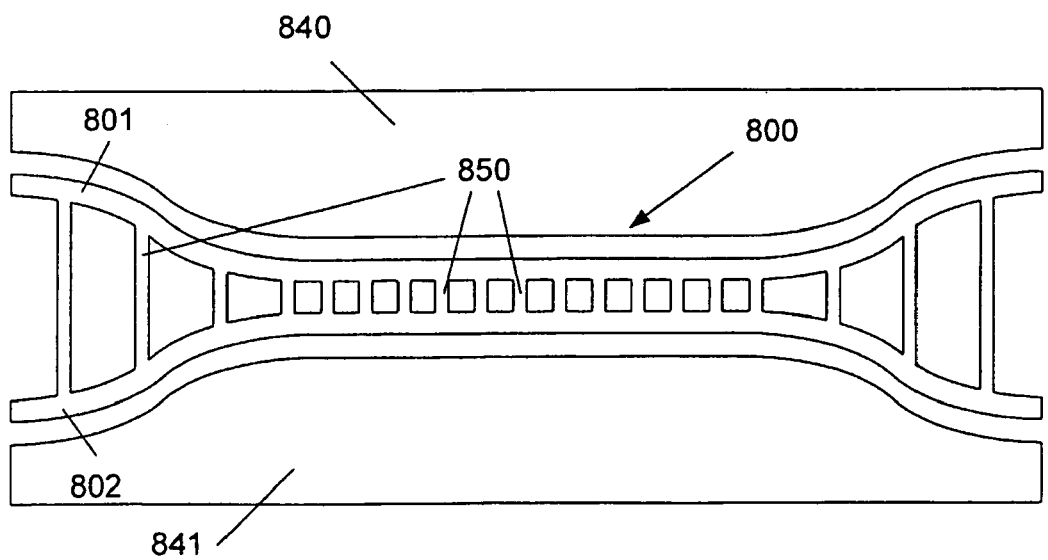
FIG. 18 shows a coupler according to the invention comprising stress relieving pads and transversal elements over the coupling length and in the regions of the coupler where the waveguides diverge/merge.

FIG. 18 shows a coupler 800 according to the invention comprising stress relieving pads 840, 841 and transversal elements 850 connecting the waveguide core sections 801, 802 of the coupler over the coupling length and in the regions of the coupler where the waveguides diverge/merge.

Figure 19:
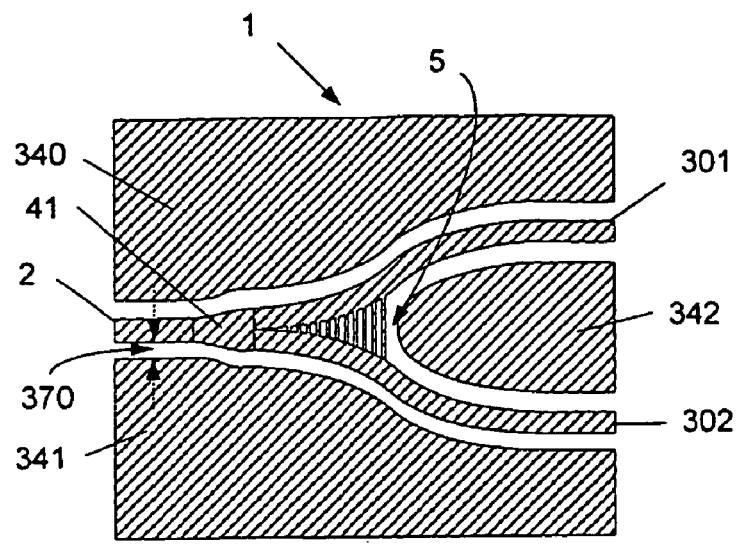
FIG. 19 shows a 1 to 2 splitter according to the invention comprising stress relieving pads and transversal elements in the splitting region.

FIG. 19 shows a one to two splitter 1 according to the invention comprising stress relieving pads 340, 341, 342 surrounding the input 2 and output 301, 302 waveguide sections and the intermediate branching element 41. The component further comprises transversal elements 5 located between the output waveguide sections in the splitting region. The distance 370 between the waveguide core sections (branching element and transversal elements) and the stress relieving pads is preferably in the range between 5 and 20 μm.

An Optical Component Comprising Segmented Waveguides and/or Waveguides with Transversal Elements Aimed at Gap-filling:

FIG. 21 shows a sketch of a traditional directional coupler 800 with two separate waveguides 801, 802 closely spaced over a length $L_{CR}$ (the coupling length) 830.

FIG. 22 schematically shows two waveguide core sections forming a directional coupler in a cross section perpendicular to the direction of light guidance of the waveguides. FIG. 22.a shows a situation where the two waveguide cores 801, 802 are perfectly covered by an upper cladding layer 62, and FIG. 22.b shows a situation where the two waveguide cores are too closely spaced and the structure cannot be perfectly filled resulting in void formation 805 in the upper cladding layer 62 between the two cores 801, 802.

FIG. 23 shows a coupler 800 according to the invention, termed type A. In the space between the two waveguide cores 801, 802, N angled cross-bars 850 having a width W and a distance between neighbours S, are inserted. The N cross-bars (where N can be any number from 1 and up, depending on the actual structure) are inserted symmetrically around the central part of the coupling region 805 (the coupling region having the length of $L_{CR}$). To reduce back-reflections each of the cross-bars 850 are angled as shown in the insert figure. The angle α between an angled edge of a cross-bar and a direction perpendicular to the direction of light propagation may preferably be in the neighbourhood of 8 degrees. However, the component will function with −45<α<45 degrees, which will not impact the effects of improved reflow and reduced birefringence.

The width W, the number N and the distance between neighbours S depend on the given geometry of the coupler. It is self-evident that the insertion of these cross-bars affects the optical coupling between the two waveguide cores, and the length of the coupling region $L_{CR}$ is calculated numerically using suitable numerical simulation software. It can be beneficial for optical loss reduction to distribute the cross-bars in such a way, that they e.g. primarily are placed in regions in the coupler structure where the optical intensity is predominantly in one of the waveguide cores and omit cross-bars in regions where the intensity is predominantly between the two cores. In this way the cross-bars are less likely to give rise to loss and back-reflections. The geometry of the embodiment depicted in FIG. 23 is as follows:

Edge-to-edge distance between waveguide core sections 801, 802 over the coupling length $L_{CR}$ 805 is 4 μm.

Coupling length $L_{CR}$ 805 is 1000 μm.

Core width is 6 μm. Core height is 6 μm.

The number of cross-bars (also termed transversal elements in other parts of the present application) is 20.

The width of the cross-bars is 2 μm.

The angle α is 8°.

The centre-to-centre distance between cross-bars is 50 μm.

Figure 24:
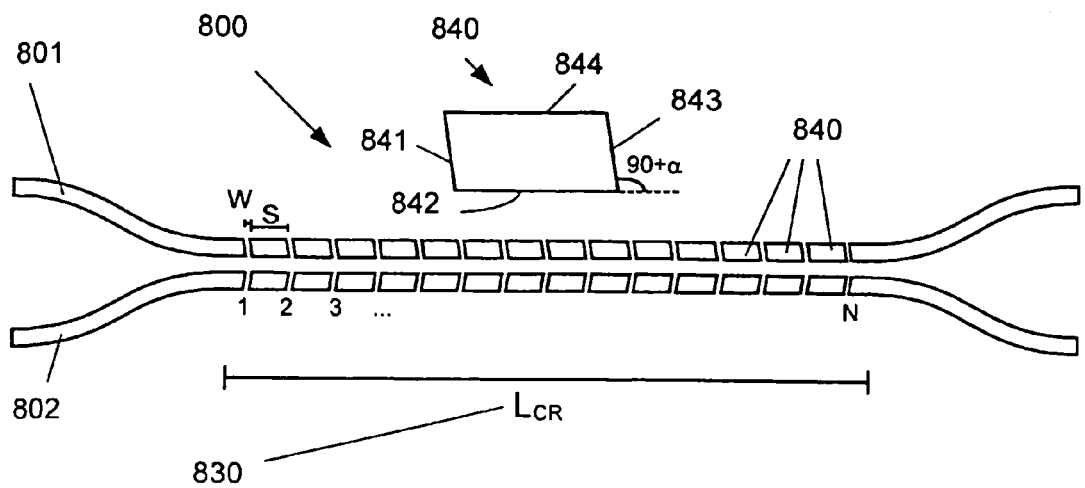
FIG. 24 shows a segment coupler according to the invention (type B) wherein each of the two closely spaced waveguide cores in the coupling region are segmented.

FIG. 24 shows a coupler 800 according to the invention, termed type B. In a segment coupler of type B each of the two closely spaced waveguide cores 801, 802 are segmented having N segments 840. Each segment 840 of the embodiment in FIG. 24 have 4 edges 841, 842, 843, 844 constituting a parallelogram. The segments have the length S and a clearance between segments of W. The facets in the segments are angled, to reduce back-reflections, such that the facets form the angle α with vertical (in other words two non-opposing sides 842, 843 together define an angle 90+α). Also for this coupler structure the length S and mutual separations W may be optimized depending upon the actual structure. The distribution of W's and S's along the coupling region must also in this case be calculated numerically.

For this type of coupler the considerations regarding the coupler termed Type A applies with minor modifications.

Since there are N punctures (i.e. the spacing between adjacent segments of core material) where the cladding material can flow more or less freely the reflow is eased hence a reduced stress-induced birefringence is likely to result (of course depending on the geometries, dimensions, materials and processing details).

Figure 25:
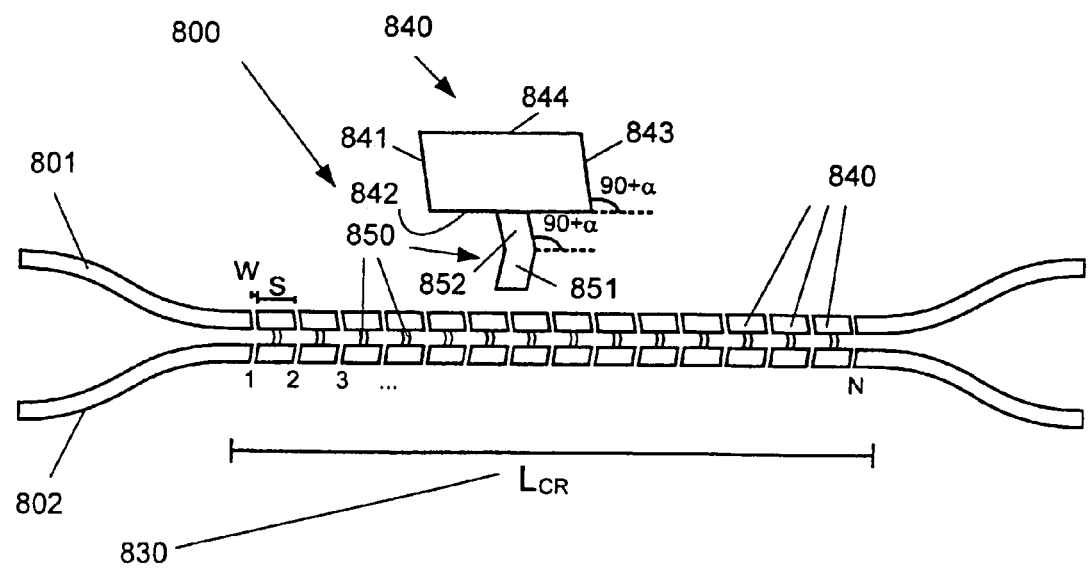
FIG. 25 shows a segment coupler according to the invention (type C) combining the features of the two types A and B of FIGS. 23 and 24.

FIG. 25 shows a coupler 800 according to the invention, termed type C. This coupler type is a combination of the two formerly described types A and B.

In segment coupler of type C the two closely spaced waveguide cores 801, 802 are punctured with N spaces between N−1 segments 840 (as type B). The N−1 separate waveguide core segments are connected by cross-bars 850 as described for the coupler of type A. Each cross-bar 850 is angled, i.e. comprises two pieces (or legs) 851, 852 that together define the angle 90+α. The considerations regarding types A and B apply to type C as well. However, it is to be expected that this structure is more stable since the segments 840 are connected to each other by cross-bars 850. For this structure all the appearing variables need be calculated numerically in a recursive loop until the optimum structure is achieved (e.g. the width of the punctures and of the cross-bars need not be identical).

Figure 26:
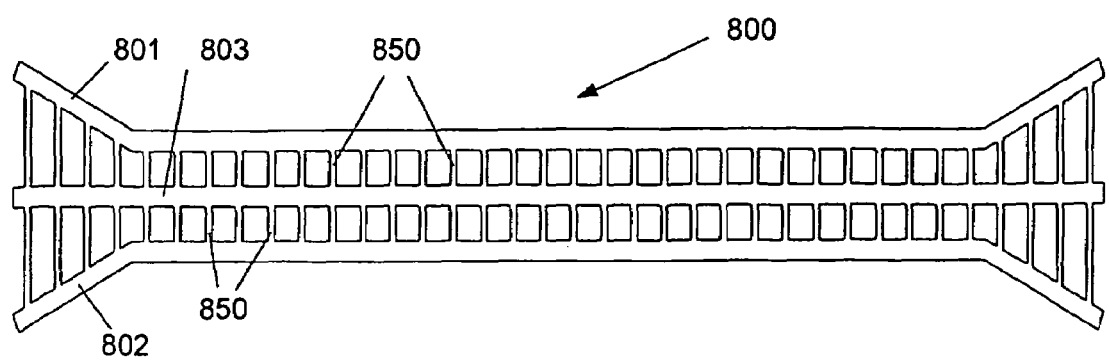
FIG. 26 shows a 3 to 3 directional coupler comprising transversal elements over the coupling length and in the regions of the coupler where the waveguides diverge/merge.

FIG. 26 shows a three to three directional coupler 800 comprising transversal elements 850 between neighbouring waveguide core sections 801, 802, 803 over the coupling length and in the regions of the coupler where the waveguides diverge/merge.

In general N, W and S are determined from the simple coupler structure as well as the viscosity of the cladding material during reflow. Using simulation software as e.g. Prometheus/OlympIOs from C2V the modified coupling length is easily calculated compared to the traditional/simple structure, and it is then possible to design a component which can be realised without voids, and which exhibit improved (reduced) birefringence.

Fabrication Technology

A branching component according to the present invention can be fabricated in a number of different planar technologies such as in polymers, in Silicon-on-insulator (SOI), Lithiumniobate (LiNbO$_3$), III-V, as well as in silica-on-Silicon and others. In an embodiment of the present invention the silica-on-silicon planar technology is used as this technology produces the most advanced and technically developed planar waveguide components. Silica waveguides possess a number of highly attractive properties such as material compatibility (optical fibres are made from the same material, silica), optimum coupling between fibre and waveguide component (refractive indices and index differences are comparable), low absorption- and propagation losses, low birefringence, high stability and low cost. Furthermore, the technology used to fabricate these silica waveguides is identical to the technology used in fabricating integrated electrical circuits such as CPU's (Central Processing Units in computers) and e.g. RAM (Random Access Memory), thus this technology has matured during the last more than thirty years and is known to be capable of mass production.

Figure 20:
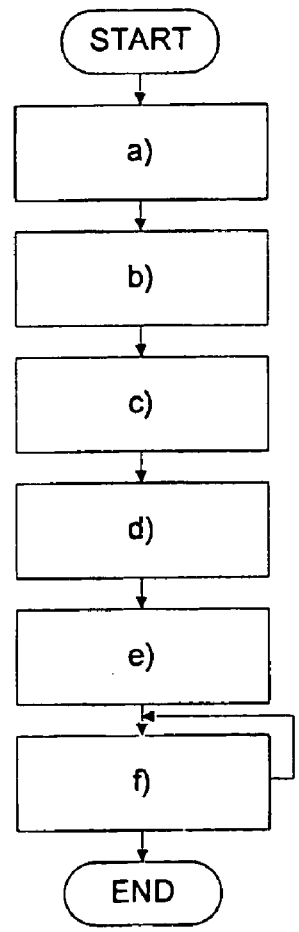
FIG. 20 shows a flow chart for a method of manufacturing an optical component according to the invention.

FIG. 20 shows a flow chart for a method of manufacturing an optical component according to the invention. The method comprises the steps a) to f) as discussed in the following.

In an embodiment of the present invention a clean and bare Silicon wafer (used as substrate, step a) is firstly oxidized (step b) to provide an optical isolation layer of silica sufficiently thick that the magnitude of the evanescent field tail of the field pertaining to the waveguide cores is sufficiently low to ensure negligible propagation loss. This first layer of silica is referred to as the buffer layer. On top of the buffer layer a layer of doped-silica is deposited (step c), containing one or more dopants that effectively act to increase the refractive index of said layer. This doped layer of silica glass is referred to as the core layer. Depending upon the method used to deposit the core layer a high temperature treatment (known as an anneal step) may be advantageous in order to stabilize the optical and/or mechanical properties of said layer. The optical waveguide circuitry is defined through standard optical lithography where a UV-transparent plate containing typically a chromium pattern replica of the waveguide design pattern and possible other structural elements (such as stress relieving and transversal elements) (step d) is pressed against a layer of UV-sensitive polymer which has been spin coated onto the surface of the core silica layer, subsequently the UV-sensitive polymer is exposed through the mask and the pattern is developed (step e). Following the exposure and development of the waveguide pattern into the polymer layer, the polymer pattern is used as masking material for dry etching (e.g. RIE—Reactive Ion Etching, ICP—Inductively Coupled Plasma) into the core silica layer (step e). Alternatively a second masking material is sandwiched between the silica core layer and the UV-sensitive polymer layer, which is used to enhance selectivity and waveguide core profile. In this way the design waveguide pattern is transferred into the core silica layer having predetermined cross-sectional properties as well as refractive index. In order to protect the recently defined waveguide core, and in order to enhance symmetry in the structure transverse to the direction of propagation a layer of silica with optical properties as close to those of the buffer layer as the chosen fabrication technology permits is deposited on top of the core structure (step f). The formation of the latter layer (e.g. termed the upper cladding layer) may be formed using successive deposition and annealing steps (step f).

Various relevant aspects of the silica-on-silicon technology is e.g. discussed in M. Kawachi, "Silica waveguide on silicon an their application to integrated-optic components", Opt. Quant. Electr. 22 (1990) 391-416, which is incorporated herein by reference. Various relevant aspects of low loss plama enhanced chemical vapour deposited planar waveguides are e.g. discussed in Christian Laurent-Lund, "PECVD grown Multiple Core Planare Waveguides with Extremely Low Interface Reflections and Losses", Photon. Technol. Lett. 10 (1998) 1431-1433, which is incorporated herein by reference. Various aspects of the technique of cladding deposition and reflow annealing using boron-phosphorus silica glass (BPSG) are disclosed in U.S. Pat. No. 6,044,192, which is incorporated herein by reference.

Some preferred embodiments have been shown in the foregoing, but it should be stressed that the invention is not limited to these, but may be embodied in other ways within the subject-matter defined in the following claims. The components described above are intended for use with light propagated from input to output. It is, however, possible to reverse the direction of light propagation, so that light is propagated from an output to an input of a component.

The invention claimed is:

1. An optical branching unit (1) formed on a substrate, the optical branching unit comprising waveguides for guiding light at a predetermined wavelength λ, the waveguides comprising a core region having a refractive index $n_{core}$, the core region being embedded in a cladding (6) having a refractive index $n_{clad}$, the waveguides comprising an input waveguide with an input core region (2) of width $w_{in}$ and at least two output waveguides having output core regions (301, 302) of widths $w_{out,i}$, a branching part (4)—having a refractive index $n_{core}$—for connecting the input and output waveguide cores, a splitting region (7) adjacent to the branching part, the width of the branching part being substantially equal to $w_{in}$ at its joint with the input waveguide core and to the sum of the widths $w_{out,i}$ at its joint with the output waveguide cores, the width of the branching part gradually expanding from its joint with the input waveguide core to allow the output waveguide cores to be branched off and diverge from each other in the splitting region wherein a multitude of M transversal waveguide core elements (5; 501, 502, 503, 504, 505, 506, 507, 508, 509, 510) each having a width $w_i$, a refractive index $n_{trans,i}$ and being embedded in said cladding are located in the splitting region forming paths with a mutual centre to centre distance of $s_i$, said transversal waveguide core elements fully or partially connecting neighbouring output waveguide cores.

2. An optical branching unit according to claim 1 wherein opposing edges of neighbouring diverging output waveguide cores meet at the joint with the branching part in a fork or Y-type structure.

3. An optical branching unit according to claim 1 wherein said branching part comprises a tapered part joining the input and output waveguide cores, the width of the tapered part being substantially equal to $w_{in}$ at its joint with the input waveguide core and to the sum of the widths $w_{out,i}$ at its joint with the output waveguide cores, and an abutting region, the output waveguide core regions being aligned with and extending from said tapered region and abutting each other in the abutting region.

4. An optical branching unit according to claim 1 wherein the optical branching unit has 1 input and 2 output waveguides.

5. An optical branching unit according to claim 1 wherein the width $w_i$ of the transversal waveguide core elements decreases with increasing i as the output waveguide cores diverge.

6. An optical branching unit according to claim 1 wherein the centre to centre distance $s_i$ between the i'th and the (i+1)'th transversal waveguide core element increases with increasing i as the output waveguide cores diverge or run in parallel.

7. An optical branching unit according to claim 1 wherein the transversal waveguide core elements run substantially mutually parallel and perpendicular to the output direction of the optical branching unit.

8. An optical branching unit according to claim 1, wherein at least one and preferably all of the transversal waveguide core elements form an uninterrupted path between two neighbouring output waveguide cores.

9. An optical branching unit according to claim 1 wherein the cladding (6) comprises lower (61) and upper (62) cladding layers, the core region (301) of a waveguide being formed in a layer applied to the lower cladding layer (61) supported by the substrate (10) and the upper cladding layer (62) being applied to cover the core region (301) and the lower cladding layer (61).

10. An optical branching unit according to claim 9 wherein the upper cladding layer (62) comprises boron and/or phosphorus doped silica glass deposited by plasma enhanced chemical vapour deposition as a succession of individually annealed layers.

11. An optical component comprising a combination of planar waveguides on a substrate, each waveguide having a core region pattern surrounded by lower and upper cladding layers and a cross-section having a width, the core region pattern being formed in a layer applied to the lower cladding layer supported by the substrate and the upper cladding layer being applied to cover the core region pattern and the lower cladding layer, the combination of waveguides comprising substantially parallel waveguide core sections adjacent to waveguide sections that diverge from said substantially parallel waveguide core sections or the combination of waveguides comprising merging waveguide core sections comprising a merged core section, where a width of the merged core section and/or a sum of respective widths of the core sections is substantially constant along said waveguide core sections, said optical component further comprising at least one solid void reducing or stress reducing structural element located in the vicinity of said waveguide core sections.

12. The optical component as claimed in claim 11 wherein said structural element includes a stress relieving element.

13. The optical component as claimed in claim 12 wherein a minimum distance between a first waveguide and said stress relieving element is smaller than three times a height of said first waveguide.

14. The optical component as claimed in claim 12 wherein said stress relieving element is elongate and has a width that is less than or equal to a width of a nearest waveguide.

15. The optical component as claimed in claim 11 wherein said structural element includes a plurality of parallel running stress relieving elements.

16. The optical component as claimed in claim 15 wherein a distance between neighbouring stress relieving elements is less than 15 μm.

17. The optical component as claimed in claim 12 wherein said stress relieving element has width dimensions that are larger than a nearest waveguide.

18. The optical component as claimed in claim 17 wherein said stress relieving element has a form that substantially matches the space between two merging or diverging waveguide core sections.

19. The optical component as claimed in claim 12 wherein said component is a branching element.

20. The optical component as claimed in claim 12 further comprising transversal elements formed in the waveguide core layer and connecting said waveguide core sections.

21. The optical component as claimed in claim 11 wherein said structural element includes segmented sections having a number of separate waveguide core pieces.

22. The optical component as claimed in claim 21 wherein two spaced waveguide sections form part of an optical coupler with said waveguide core pieces being essentially formed as parallelograms when viewed in a planar cross section.

23. The optical component as claimed in claim 21 comprising two spaced substantially parallel waveguide sections wherein cross sections of the two waveguide sections when viewed in a planar cross section are mirror symmetric around an axis midway between the centre axes of the two waveguide sections.

24. The optical component as claimed in claim 21 wherein spacing between each waveguide segment in a direction of intended light transmission of a waveguide section is identical for all segments.

25. The optical component as claimed in claim 22 wherein an angle of a parallelogram 90°+α defining a waveguide piece as defined by an edge of one waveguide section facing the other waveguide section and the first edge encountered by light propagated in the intended direction of light transmission is larger than 90°.

26. The optical component as claimed in claim 25 wherein the angle α is around 8°.

27. The optical component as claimed in claim 21 further comprising transversal waveguide core elements between segmented waveguide sections.

28. The optical component as claimed in claim 27 wherein the transversal waveguide core elements of a waveguide section are angled compared to an intended direction of light transmission of the waveguide section.

29. The optical component as claimed in claim 28 wherein the transversal waveguide elements meet corresponding waveguide segments at an angle substantially equal to 90−α.

30. The optical component as claimed in claim 27 wherein the transversal waveguide elements are segmented.

31. The optical component as claimed in claim 11 wherein said component is a coupler and the combination of waveguides includes a length of at least two spaced waveguide core sections, said structural element including transversal elements arranged between said spaced waveguide core sections, said at least two waveguide sections having, over a certain length, substantially parallel sections that diverge from each other at both ends of the parallel sections.

32. The optical component as claimed in claim 31 wherein two spaced waveguide sections are substantially parallel with cross sections of the two waveguide sections and connecting transversal elements, when viewed in a planar cross section, being mirror symmetric around an axis midway between the centre axes of the two waveguide sections.

33. The optical component as claimed in claim 32 wherein the transversal elements of a waveguide section are angled compared to an intended direction of light transmission of the waveguide section to minimize back-reflections.

34. The optical component as claimed in claim 33 wherein said spaced waveguide core sections are segmented, each having a number of waveguide core pieces separated by a space filled with upper cladding material.

35. A method of manufacturing an optical component having a combination of planar waveguides on a substrate, each waveguide having a core region pattern surrounded by lower and upper cladding layers and a cross-section having a width, the core region pattern being formed in a layer applied to the lower cladding layer supported by the substrate and the upper cladding layer being applied to cover the core region pattern and the lower cladding layer, the combination of waveguides comprising substantially parallel waveguide core sections adjacent to waveguide sections that diverge from said substantially parallel waveguide core sections or the combination of waveguides comprising merging waveguide core sections comprising a merged core section, where a width of the merged core section and/or a sum of respective widths of the core sections is substantially constant along said waveguide core sections, said optical component further comprising at least one solid void reducing or stress reducing structural element located in the vicinity of said waveguide core sections, the method comprising the steps of:
  a) providing a substrate;
  b) forming a lower cladding layer on the substrate;
  c) forming a core layer on the lower cladding layer;
  d) providing a core mask comprising a core pattern corresponding to the core region layout and a layout of said structural elements in the vicinity of said waveguide core sections;
  e) forming core sections and structural elements using said core mask, a photolithographic and an etching process; and
  f) forming an upper cladding layer to cover the waveguide core sections, the structural elements and the lower cladding layer.

36. The method as claimed in claim 35 wherein the step of providing a substrate includes providing a silicon substrate, and the core and cladding layers include silica glass.

37. The method as claimed in claim 35 wherein the step of forming an upper cladding layer includes forming an upper cladding layer having a lower flow temperature than that of the core and the lower cladding layer.

38. The method as claimed in claim 37 wherein the upper cladding layer is formed including boron and/or phosphorus.

39. The method as claimed in claim 35 wherein at least some of the layers on the substrate are formed by plasma enhanced chemical vapour deposition.

40. The method as claimed in claim 37 wherein step f) includes successive deposition and annealing steps.

41. The method as claimed in claim 35 wherein step e) includes forming said core sections and structural elements that include transversal elements that extend between at least two of said waveguide core sections so that said at least two core sections are fully or partially connected by said transversal elements.

42. The method as claimed in claim 41 wherein the waveguide core sections that are fully or partially connected by transversal elements are formed to run essentially parallel over a certain length of the waveguides.

43. The method as claimed in claim 41 wherein the waveguide core sections that are fully or partially connected by transversal elements are formed to essentially diverge from each other over a certain length of the waveguides.

44. The method as claimed in claim 41 wherein at least one of the transversal elements is formed to fully connect two waveguide core sections.

45. The method as claimed in claim 35 wherein step e) includes forming said core sections and structural elements that include stress relieving elements in the vicinity of said waveguide core sections.

46. The method as claimed in claim 45 wherein a flow temperature of the upper cladding layer is adapted so that the waveguide core sections do not flow during an annealing that flows the upper cladding layer.

47. The optical component as claimed in claim 19 wherein said branching element is a coupler or a splitter.

48. The optical component as claimed in claim 12 wherein said stress relieving element is made of the same material and in the same process step as the core region patterns.

49. The optical component as claimed in claim 12 wherein a minimum distance between a first waveguide and said stress relieving element is smaller than twice a height of said first waveguide.

50. The optical component as claimed in claim 12 wherein a minimum distance between a first waveguide and said stress relieving element is smaller than a height of said first waveguide.

51. The optical component as claimed in claim 15 wherein a distance between neighbouring stress relieving elements is less than 10 μm.

52. The optical component as claimed in claim 15 wherein a distance between neighbouring stress relieving elements is less than 5 μm.

53. An optical component comprising a combination of planar waveguides including input waveguides, output waveguides and a transitions section on a substrate, each waveguide having a core region pattern surrounded by lower and upper cladding layers, the core region pattern being formed in a layer applied to the lower cladding layer supported by the substrate and the upper cladding layer being applied to cover the core region pattern and the lower cladding layer, said component defining a coordinate system in the plane of the substrate with origin in the geometric center of said component, a first axis along an overall direction of light propagation and a second axis perpendicular to the first axis, said component defining two outline curves along outermost waveguides measured along said second axis, said outline curves being a monotonically increasing or decreasing function from the origin of the coordinate system and the combination of waveguides comprising at least one solid void reducing or stress reducing structural element located in a vicinity of said transitions section, said input waveguides and/or said output waveguides.

54. The optical component of claim 53, wherein said planar waveguides comprise segmented waveguide sections comprising one or more gaps so that an outline curve is taken as a curve comprising said segments and continuously traversing said gaps with curve segments of minimal length.

55. The optical component of claim 53, wherein said outline curves are continuous.

56. The optical component of claim 55, wherein the optical component is a branching unit.

57. The optical component of claim 55, wherein the optical component is a splitter or coupler.

58. An optical component comprising a combination of planar waveguides on a substrate comprising at least one branching unit selected from the group of coupler and splitter, each waveguide having a core region pattern surrounded by lower and upper cladding layers and a width of the transversal cross section, the core region pattern being formed in a layer applied to the lower cladding layer supported by the substrate and the upper cladding layer being applied to cover the core region pattern and the lower cladding layer, said optical component further comprising at least one solid void reducing or stress reducing structural element located in the vicinity of said branching unit.

* * * * *